United States Patent
Liu et al.

(10) Patent No.: US 11,019,364 B2
(45) Date of Patent: May 25, 2021

(54) COMPRESSION OF IMAGES HAVING OVERLAPPING FIELDS OF VIEW USING MACHINE-LEARNED MODELS

(71) Applicant: UATC, LLC, San Francisco, CA (US)

(72) Inventors: Jerry Junkai Liu, Toronto (CA); Shenlong Wang, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 16/825,095

(22) Filed: Mar. 20, 2020

(65) Prior Publication Data
US 2020/0304835 A1 Sep. 24, 2020

Related U.S. Application Data

(60) Provisional application No. 62/969,990, filed on Feb. 4, 2020, provisional application No. 62/822,842, filed on Mar. 23, 2019.

(51) Int. Cl.
*H04N 19/597* (2014.01)
*H04N 19/20* (2014.01)
(Continued)

(52) U.S. Cl.
CPC ............ *H04N 19/597* (2014.11); *G06N 3/04* (2013.01); *G06N 3/08* (2013.01); *H04N 19/20* (2014.11); *H04N 19/91* (2014.11)

(58) Field of Classification Search
CPC ...... H04N 19/597; H04N 19/91; H04N 19/20; G06N 3/04; G06N 3/08; G06N 3/0454; G06N 3/088
(Continued)

(56) References Cited

U.S. PATENT DOCUMENTS

| | | | |
|---|---|---|---|
| 2018/0124414 A1* | 5/2018 | Van Leuven | H04N 19/30 |
| 2018/0293737 A1 | 10/2018 | Sun et al. | |
| 2019/0045168 A1 | 2/2019 | Chaudhuri et al. | |

FOREIGN PATENT DOCUMENTS

WO   WO 2017/191461   11/2017

OTHER PUBLICATIONS

Ballé et al., "Variational Image Compression with a Scale Hyperprior", arXiv:1802.01436v2, 23 pages.
(Continued)

*Primary Examiner* — Susan E. Hodges
(74) *Attorney, Agent, or Firm* — Dority & Manning, P.A.

(57) ABSTRACT

A machine-learned image compression model includes a first encoder configured to generate a first image code based at least in part on first image data. The first encoder includes a first series of convolutional layers configured to generate a first series of respective feature maps based at least in part on the first image. A second encoder is configured to generate a second image code based at least in part on second image data and includes a second series of convolutional layers configured to generate a second series of respective feature maps based at least in part on the second image and disparity-warped feature data. Respective parametric skip functions associated convolutional layers of the second series are configured to generate disparity-warped feature data based at least in part on disparity associated with the first series of respective feature maps and the second series of respective feature maps.

20 Claims, 15 Drawing Sheets

(51) Int. Cl.
　　　*G06N 3/04*　　　(2006.01)
　　　*G06N 3/08*　　　(2006.01)
　　　*H04N 19/91*　　(2014.01)

(58) Field of Classification Search
　　　USPC .......................................................... 375/240
　　　See application file for complete search history.

(56) References Cited

OTHER PUBLICATIONS

International Search Report and Written Opinion for Application No. PCT/US12345/1234, dated Jul. 24, 2020, 12 pages.
Liu et al., "DSIC: Deep Stereo Image Compression", 2019 IEEE/CVF International Conference on Computer Vision (ICCV), Oct. 27, 2019, pp. 3136-3145.

* cited by examiner

COMPRESSION OF IMAGES HAVING OVERLAPPING FIELDS OF VIEW USING MACHINE-LEARNED MODELS

RELATED APPLICATION

This application claims priority to and the benefit of U.S. Provisional Patent Application No. 62/822,842 filed on Mar. 23, 2019 and U.S. Provisional Patent Application No. 62/969,990 filed on Feb. 4, 2020. U.S. Provisional Patent Application No. 62/822,842 and U.S. Provisional Patent Application No. 62/969,990 are hereby incorporated by reference herein in their entirety.

FIELD

The present disclosure relates generally to improving the ability of computing devices to compress image data.

BACKGROUND

Many applications such as autonomous vehicles and three-dimensional movies involve the use of stereo camera pairs. These arrays of cameras oftentimes capture and store massive quantities of data per day, which require good image compression algorithms to ensure an efficient use of space. Some approaches to image compression include compressing the image streams from each camera separately. However, such approaches may be inefficient through their view of the images independently. Hence, there is a need for improved compression method for images.

SUMMARY

Aspects and advantages of embodiments of the present disclosure will be set forth in part in the following description, or may be learned from the description, or may be learned through practice of the embodiments.

One example aspect of the present disclosure is directed to a computing system including one or more processors and one or more non-transitory computer-readable media that collectively store a machine-learned image compression model configured to generate compressed image data in response to image data associated with at least two image sensors having at least partially overlapping fields of view. The machine-learned image compression model includes a first encoder configured to generate a first image code based at least in part on first image data indicative of a first image associated with a first image sensor. The first encoder includes a first series of convolutional layers configured to generate a first series of respective feature maps based at least in part on the first image. The model includes a second encoder configured to generate a second image code based at least in part on second image data indicative of a second image associated with a second image sensor. The second encoder includes a second series of convolutional layers configured to generate a second series of respective feature maps based at least in part on the second image and disparity-warped feature data associated with the first image. The model includes a plurality of respective parametric skip functions associated with at least a subset of convolutional layers of the second series of convolutional layers and configured to generate the disparity-warped feature data based at least in part on disparity associated with the first series of respective feature maps and the second series of respective feature maps.

Another example aspect of the present disclosure is directed to a computer-implemented method of digital image compression. The method includes obtaining, by a computing system comprising one or more computing devices, first image data indicative of a first image associated with a first image sensor and second image data indicative of a second image associated with a second image sensor. The method includes encoding, by the computing system using a first series of convolutional layers of a machine-learned image compression model, the first image data indicative of the first image into a first series of respective feature maps and a first image code. The method includes generating, by the computing system using a plurality of parametric skip functions of the machine-learned image compression model, disparity-warped featured data based at least in part on the first series of respective feature maps and a second series of respective feature maps. The method includes encoding, by the computing system using a second series of convolutional layers of a machine-learned image compression model, the second image data indicative of the second image into the second series of respective feature maps and a second image code based at least in part on the disparity-warped feature data.

Yet another example aspect of the present disclosure is directed to an autonomous vehicle that includes a plurality of vehicle sensors including a first image sensor and a second image sensor, one or more processors, and one or more tangible, non-transitory, computer readable media that collectively store instructions that when executed by the one or more processors cause the one or more processors to perform operations. The operations include obtaining first image data indicative of a first image associated with the first image sensor and second image data indicative of a second image associated with the second image sensor. The operations include encoding, using a first series of convolutional layers of a machine-learned image compression model, the first image data indicative of the first image into a first series of respective feature maps and a first image code. The operations include generating, using a plurality of skip functions of the machine-learned image compression model, disparity-warped featured data based at least in part on the first series of respective feature maps and a second series of respective feature maps. The operations include encoding, using a second series of convolutional layers of the machine-learned image compression model, the second image data indicative of the second image into the second series of respective feature maps and a second image code based at least in part on the disparity-warped feature data.

Other example aspects of the present disclosure are directed to systems, methods, vehicles, apparatuses, tangible, non-transitory computer-readable media, and memory devices for compressing data.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
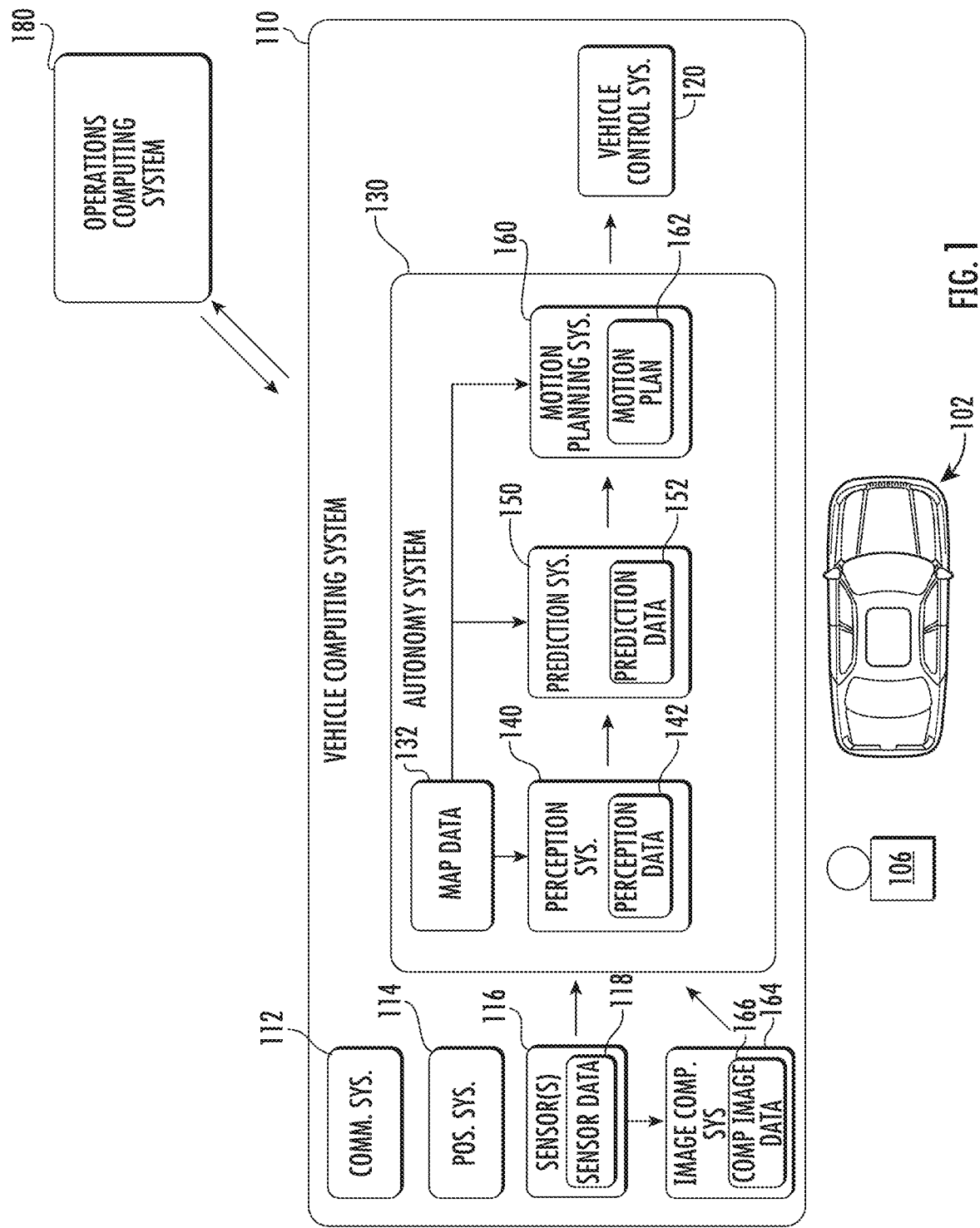
FIG. 1 depicts an example system overview including an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved systems and methods for image compression of multiple images using one or machine-learned models including skip functions that are trained to propagate information between images. For example, the machine learned model(s) can extract information from one image in order to reduce the bitrate of another image when generating compressed image data for both images such that the overall bitrate for the images is reduced. More particularly, a machine-learned image compression model is provided that utilizes parametric skip functions to enhance the compression of a second image based on disparity-warped features generated from a first image, such as a pair of stereo images that have at least partially overlapping fields of view. The model can utilize single image compression autoencoders that are enhanced with the parametric skip functions to feed fully differentiable, disparity-warped features at multiple levels to encoders and/or decoders for the second image. By passing multi-level information from the encoders and/or decoders for the first image, fewer bits can be stored for the second image. Additionally, in some examples, a probabilistic dependence between images codes for a first image and a second image can be modeled using a conditional entropy model. The conditional entropy model can capture a correlation between the two images to help reduce the joint entropy of the two image codes. In this manner, the joint bitrate of the two image codes can be reduced. By utilizing parametric skip functions and a conditional entropy model, a machine-learned image compression system can reduce the bitrates of images to provide an efficient use of storage space. For example, the machine-learned image compression system can be used by an autonomous vehicle to efficiently store image data associated with a stereo pair of image sensors used as part of a vehicle computing system of the vehicle. While many examples are provided with respect to stereo pairs, the disclosed technology can be utilized with two or more images having at least partially overlapping fields of view.

According to example aspects of the present disclosure, a single machine-learned image compression model is provided that can jointly compress two or more images having at least partially overlapping fields of view. In some examples, the model can extract information from one image in order to reduce the bitrate in the second image, such that the total bitrate for the pair is lower than the result of single-image compression. In an example approach, a two-stream deep encoder-decoder network is provided. Each image in a pair of images such as a stereo pair can be passed to a separate encoder/quantizer to generate a discretized image code (e.g., latent code). A decoder can be used to reconstruct the image from the latent image code. Parametric skip functions can be provided in order to propagate information from the feature maps generated by the encoder/decoder for the first image to the encoder/decoder for the second image. In this manner, a reduced number of bits can be stored for the second image code. A conditional entropy model can be used to model the correlation between the two image codes of the two images to reduce the joint entropy, and hence the joint bitrate, of the two image codes.

According to example aspects of the present disclosure, a machine-learned image compression model can include a first encoder configured to encode a first image into an image code such as a first latent image code in a latent space and a second encoder configured to encode a second image into a second image code such as a second latent image code in the latent space. The first encoder can include a series of convolutional layers where each layer generates a respective feature map based on the first image. The second encoder can include a second series of convolutional layers where each layer generates a respective feature map based on the second image and disparity-warped feature data associated with the first image and the second image. The disparity-warped feature data can be generated by a set of parametric skip functions for at least a subset of the convolutional layers of the second encoder.

Similarly, the model can include a first decoder configured to reconstruct the first image from the first image code and a second decoder configured to reconstruct the second image using the second image code. The first decoder can include a series of convolutional layers where each layer generates a respective feature map based on the first image code. The second decoder can include a second series of convolutional layers where each layer generates a respective feature map based on the second image code and disparity-warped feature data associated with the first image and the second image. The disparity-warped feature data can be generated by a set of parametric skip functions for at least a subset of the convolutional layers of the second decoder. Additional encoders and decoders can be used to process additional images, such as three or more images having at least partially overlapping fields of view.

In example embodiments, the set of parametric skip functions for the second encoder and decoder can include a respective parametric skip function for each convolutional layer of a subset of the convolutional layers for the second encoder or decoder. For instance, the subset can include each convolutional layer except the first convolutional layer of the series of convolutional layers of the second encoder or second decoder. By way of example, each parametric skip function can propagate image information from the first encoder to the second encoder or from the first decoder to the second decoder. More particularly, the parametric skip functions can exploit the correlation between the feature maps of the two images at one or more levels of the encoder/decoder. By estimating the disparity between each pair of feature maps for a given level, the image compression model can warp features from the first feature map associated with the first image to the second feature map associated with the second image. By warping features, the pixel-level alignment between the two feature maps can be improved which can enable the model to accurately pass information from the first feature map to the corresponding spatial positions of the second feature map.

According to some aspects, the parametric skip function for a particular level of the second encoder can include three inputs. The first input can receive a first feature map from the previous convolutional layer of the first encoder (e.g., for image 1). The second input can receive a second feature map from the previous convolutional layer of the second encoder (e.g., for image 2). The third input can receive the first image code. The parametric skip function can generate disparity-warped feature data based at least in part on disparity between the first image and the second image. The disparity-warped feature data can include disparity-warped features generated by warping features from the first feature map to the second feature map. By way of example, the disparity-warped features can be generated and provided to all or a portion of the levels of the encoder for the second image. Additionally or alternatively, the disparity-warped feature data can include predicted features for the feature map corresponding to the second image.

Similarly, the parametric skip function for a particular level of the second decoder can include three inputs. The first input can receive a first feature map from the previous convolutional layer of the first decoder. The second input can receive a second feature map from the previous convolutional layer of the second decoder. The third input can receive the first image code. The parametric skip function can generate disparity-warped feature data based at least in part on disparity between the first image and the second image. The disparity-warped feature data can include disparity-warped features generated by warping features from the first feature map to the second feature map. By way of example, the disparity-warped features can be generated and provided to all or a portion of the levels of the decoder for the second image.

According to example aspects, the parametric skip function for a particular level of the second encoder/decoder can include a fully convolutional global context encoding unit, a cost volume estimation unit, a feature warping unit, and an aggregation function unit. The global context encoding unit can be configured to encode the image code of the first image to a feature descriptor in order to capture global context information of the first image contained in its latent code. The global context feature can be shared across all the different levels of the image compression system. The stereo cost volume component of the skip function can estimate a cost volume from the inputs to the parametric skip function including the first feature map, the second feature map, and the global context. The feature warping unit can warp features from the first image to the second image. In some examples, the feature warping unit can generate a warped feature map which better aligns with the feature map of the second image. The aggregation function unit can be configured to predict the feature map of the second image which can be provided as the final output of the parametric skip function.

In some examples, the machine-learned image compression system can include a conditional entropy model configured to accurately model the entropy of the quantized image codes based on the correlation between the image codes of the two images. The image codes of the two images can include highly correlated image content, such as where the images are a stereo pair of images from closely aligned image sensors having at least partially overlapping fields of view. The conditional entropy model can be a joint entropy model including a plurality of neural networks configured to estimate a joint distribution of the first image code and the second image code. The conditional entropy model can model the joint distribution probability of the first image code and the second image code, taking into account the dependence of the second image code on the first image code. By way of example, the conditional entropy model can determine a probability of the first image code given a hyperprior derived for the first image code. Additionally or alternatively, the conditional entropy model can determine the probability of the second image code given the first image code and a hyperprior derived for the second image code.

In some examples, the machine-learned image compression model can include an end-to-end deep architecture where implicit depth estimation and compression are performed jointly. The model can be trained end-to-end using an objective function including a component associated with reconstruction quality of the images and a component associated with the bitrate predicted by the conditional entropy model.

A machine learned image compression system in accordance with example embodiments of the present disclosure can be trained end-to-end to minimize an objective function. The objective function can include a first term or component that encodes the reconstruction quality of multiple images. For example, the first term can represent a distortion associated with a first image and a distortion associated with a second image. The objective function can include a second term or component that includes the rate predicted by the entropy model. For example, the second term can represent a predicted bit rate for the first image code and a predicted bit rate for the second image code. A target bit rate for a given model can be enforced using a modified rate function. The modified rate function can include a desired target entropy calculated from the target bit rate.

In some examples, the systems and methods of the present disclosure can include an autonomous vehicle or other system that includes or otherwise leverages a machine-learned image compression model. An autonomous vehicle (e.g., ground-based vehicle, aircraft, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, GPS, etc.), access map data associated with an environment external to the autonomous vehicle and generate an appropriate motion plan through the vehicle's surrounding environment based on the sensor data and map data. To more accurately and efficiently generate a motion plan through the autonomous vehicle's surrounding environment, an autonomy computing system can utilize compressed sensor data such as compressed image data to represent the output of one or more sensors. In accordance with example embodiments, the image data from a first image sensor and the image data from a second image sensor, such as from a stereo pair of image sensors, can be jointly compressed. In other example embodiments, the image data from three or more image sensor having at least partially overlapping fields of view can be jointly compressed. The vehicle computing system can generate compressed image data using one or more machine-learned image compression models. The image compression model(s) can encode a second image of the second image sensor using parametric skip functions to propagate information from a first image of the first image sensor to encoders and/or decoders for the second image. Moreover, the image compression model(s) can generate image codes for the images using a conditional entropy model to model the joint distribution of both image codes, taking into account the dependence of the second image on the first image.

Embodiments in accordance with the disclosed technology provide a number of technical effects and benefits, particularly in the areas of computing technology, autonomous vehicles, and the integration of computing technology with autonomous vehicles. In particular, example implementations of the disclosed technology provide improved techniques for generating compressed sensor data such as compressed image data for autonomous vehicles. For example, by utilizing one or more implementations of the disclosed technology, a computing system can more accurately and efficiently generate compressed image data from different sensors by exploiting the dependence of one image on another image using one or more machine learned models. In this manner, for instance, a vehicle computing system can more accurately and efficiently generate motion plans for an autonomous vehicle and thereby enable the autonomous vehicle to drive autonomously in complex scenarios that may include traffic light handling, yielding, and interactions with multiple actors such as pedestrians and other vehicles.

By combining single image compression autoencoders with parametric skip functions, fully differentiable, disparity-warped features can be provided at one or more levels of an encoder and/or decoder for the second image in example embodiments. Information can be propagated from the first image to the encoders and/or decoders for the second image using the parametric skip functions so that enhanced compression can be achieved relative to single image compression techniques alone. Moreover, by modeling the probabilistic dependence between image codes using a conditional entropy model, a further reduction in the second image bit rate compared to deep single image compression techniques can be achieved in example embodiments. By capturing the dependence of a second image on a first image, the conditional entropy model can help reduce the joint entropy between the image codes, and hence the joint bit rate of the two image codes.

In some examples, an end to end deep architecture for multiple image compression (e.g., stereo image compression) is provided. The architecture can provide implicit depth estimation and compression that are performed jointly in the machine learned image compression model. In this manner, the bit rate of a combined latent code can be lower than the sum of the bit rates if images are compressed separately. This can be achieved using a single image compression model that jointly compresses multiple images such as two stereo images. As much information as possible can be extracted from a first image in order to reduce the bit rate in a second image, such that the total bit rate is lower than the result of independent single image compression. Multilevel, parametric skip functions can be utilized to propagate information from a first image to encoders and/or decoders for a second image in order to reduce the bit rate of the second image. A conditional entropy model can be utilized to model the correlation between image codes of the two images in order to further reduce the bit rate of the image codes. The architecture can be trained end to end to minimize an objective function including terms for encoding a reconstruction quality of both images and providing a rate predicted by the entropy model.

Accordingly, a computing system according to an example aspect of the present disclosure can include one or more processors, and one or more non-transitory computer-readable media that collectively store a machine-learned image compression model configured to generate compressed image data in response to image data associated with at least two image sensors having at least partially overlapping fields of view. The machine-learned image compression model can include a first encoder configured to generate a first image code based at least in part on first image data indicative of a first image associated with a first image sensor. The first encoder can include a first series of convolutional layers configured to generate a first series of respective feature maps based at least in part on the first image. The model can include a second encoder configured to generate a second image code based at least in part on second image data indicative of a second image associated with a second image sensor. The second encoder can include a second series of convolutional layers configured to generate a second series of respective feature maps based at least in part on the second image and disparity-warped feature data associated with the first image. The model can include a plurality of respective parametric skip functions associated with at least a subset of convolutional layers of the second series of convolutional layers and configured to generate the disparity-warped feature data based at least in part on disparity associated with the first series of respective feature maps and the second series of respective feature maps.

A computer-implemented method of digital image compression according to an example aspect of the present disclosure can include obtaining, by a computing system comprising one or more computing devices, first image data indicative of a first image associated with a first image sensor and second image data indicative of a second image associated with a second image sensor. The method can include encoding, by the computing system using a first series of convolutional layers of a machine-learned image compression model, the first image data indicative of the first image into a first series of respective feature maps and a first image code. The method can include generating, by the computing system using a plurality of parametric skip functions of the machine-learned image compression model, disparity-warped featured data based at least in part on the first series of respective feature maps and a second series of respective feature maps. The method can include encoding, by the computing system using a second series of convolutional layers of a machine-learned image compression model, the second image data indicative of the second image into the second series of respective feature maps and a second image code based at least in part on the disparity-warped feature data.

An autonomous vehicle according to an example aspect of the present disclosure can include a plurality of vehicle sensors including a first image sensor and a second image sensor, one or more processors, and one or more tangible, non-transitory, computer readable media that collectively store instructions that when executed by the one or more processors cause the one or more processors to perform operations. The operations can include obtaining first image data indicative of a first image associated with the first image sensor and second image data indicative of a second image associated with the second image sensor. The operations can include encoding, using a first series of convolutional layers of a machine-learned image compression model, the first image data indicative of the first image into a first series of respective feature maps and a first image code. The operations can include generating, using a plurality of skip functions of the machine-learned image compression model, disparity-warped featured data based at least in part on the first series of respective feature maps and a second series of respective feature maps. The operations can include encoding, using a second series of convolutional layers of the machine-learned image compression model, the second image data indicative of the second image into the second series of respective feature maps and a second image code based at least in part on the disparity-warped feature data.

With reference now to the figures, example embodiments of the present disclosure will be discussed in further detail.

FIG. 1 illustrates an example vehicle computing system 110 according to example embodiments of the present disclosure. The vehicle computing system 110 can be associated with a vehicle 102. The vehicle computing system 110 can be located onboard (e.g., included on and/or within) the vehicle 102.

The vehicle 102 incorporating the vehicle computing system 110 can be various types of vehicles. In some implementations, the vehicle 102 can be an autonomous vehicle. For instance, the vehicle 102 can be a ground-based autonomous vehicle such as an autonomous car, autonomous truck, autonomous bus, etc. The vehicle 102 can be an air-based autonomous vehicle (e.g., airplane, helicopter, bike, scooter, or other aircraft) or other types of vehicles (e.g., watercraft, etc.). The vehicle 102 can drive, navigate, operate, etc. with minimal and/or no interaction from a human operator 106 (e.g., driver). An operator 106 (also referred to as a vehicle operator) can be included in the vehicle 102 and/or remote from the vehicle 102. Moreover, in some implementations, the vehicle 102 can be a non-autonomous vehicle. The operator 106 can be associated with the vehicle 102 to take manual control of the vehicle, if necessary. For instance, in a testing scenario, a vehicle 102 can be periodically tested with controlled faults that can be injected into an autonomous vehicle's autonomy system 130. This can help the vehicle's response to certain scenarios. A vehicle operator 106 can be located within the vehicle 102 and/or remote from the vehicle 102 to take control of the vehicle 102 (e.g., in the event the fault results in the vehicle exiting from a fully autonomous mode in the testing environment).

The vehicle 102 can be configured to operate in a plurality of operating modes. For example, the vehicle 102 can be configured to operate in a fully autonomous (e.g., self-driving) operating mode in which the vehicle 102 is controllable without user input (e.g., can drive and navigate with no input from a vehicle operator present in the vehicle 102 and/or remote from the vehicle 102). The vehicle 102 can operate in a semi-autonomous operating mode in which the vehicle 105 can operate with some input from a vehicle operator present in the vehicle 102 (and/or a human operator that is remote from the vehicle 102). The vehicle 102 can enter into a manual operating mode in which the vehicle 102 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 102 can implement vehicle operating assistance technology (e.g., collision mitigation system, power assist steering, etc.) while in the manual operating mode to help assist the vehicle operator 106 of the vehicle 102. For example, a collision mitigation system can utilize information concerning vehicle trajectories within the vehicle's surrounding environment to help an operator avoid collisions even when in manual mode.

The operating modes of the vehicle 102 can be stored in a memory onboard the vehicle 102. For example, the operating modes can be defined by an operating mode data structure (e.g., rule, list, table, etc.) that indicates one or more operating parameters for the vehicle 102, while in the particular operating mode. For example, an operating mode data structure can indicate that the vehicle 102 is to autonomously plan its motion when in the fully autonomous operating mode. The vehicle computing system 110 can access the memory when implementing an operating mode.

The operating mode of the vehicle 102 can be adjusted in a variety of manners. For example, the operating mode of the vehicle 102 can be selected remotely, off-board the vehicle 105. For example, a remote computing system (e.g., of a vehicle provider and/or service entity associated with the vehicle 102) can communicate data to the vehicle 102 instructing the vehicle 102 to enter into, exit from, maintain, etc. an operating mode. For example, in some implementations, the remote computing system can be an operations computing system 180, as disclosed herein. By way of example, such data communicated to a vehicle 102 by the operations computing system 180 can instruct the vehicle 102 to enter into the fully autonomous operating mode. In some implementations, the operating mode of the vehicle 102 can be set onboard and/or near the vehicle 102. For example, the vehicle computing system 100 can automatically determine when and where the vehicle 102 is to enter, change, maintain, etc. a particular operating mode (e.g., without user input). Additionally, or alternatively, the operating mode of the vehicle 102 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 102). In some implementations, the operating mode of the vehicle 102 can be adjusted by manipulating a series of interfaces in a particular order to cause the vehicle 102 to enter into a particular operating mode.

The vehicle computing system 110 can include one or more computing devices located onboard the vehicle 102. For example, the computing device(s) can be located on and/or within the vehicle 102. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 102 (e.g., its computing system, one or more processors, etc.) to perform operations and functions, such as those described herein for identifying travel way features.

The vehicle 102 can include a communications system 112 configured to allow the vehicle computing system 110 (and its computing device(s)) to communicate with other computing devices. The vehicle computing system 110 can use the communications system 112 to communicate with one or more computing device(s) that are remote from the vehicle 102 over one or more networks (e.g., via one or more wireless signal connections). For example, the communications system 112 can allow the vehicle computing system 110 to communicate with an operations computing system 180. By way of example, the operations computing system 180 can include one or more remote servers communicatively linked to the vehicle computing system 110. In some implementations, the communications system 112 can allow communication among one or more of the system(s) onboard the vehicle 102. The communications system 112 can include any suitable components for interfacing with one or more network(s), including, for example, transmitters, receivers, ports, controllers, antennas, and/or other suitable components that can help facilitate communication.

As shown in FIG. 1, the vehicle 102 can include one or more vehicle sensor(s) 116, an autonomy computing system 130, one or more vehicle control systems 120, one or more positioning systems 114, and other systems, as described herein. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can send and/or receive data, messages, signals, etc. amongst one another via the communication channel.

The vehicle sensor(s) 116 can be configured to acquire sensor data 118. This can include sensor data associated with the surrounding environment of the vehicle 102. For instance, the sensor data 118 can include two-dimensional data depicting the surrounding environment of the vehicle 102. In addition, or alternatively, the sensor data 118 can include three-dimensional data associated with the surrounding environment of the vehicle 102. For example, the sensor(s) 116 can be configured to acquire image(s) and/or other two- or three-dimensional data within a field of view of one or more of the vehicle sensor(s) 116. The vehicle sensor(s) 116 can include a Light Detection and Ranging (LIDAR) system, a Radio Detection and Ranging (RADAR) system, one or more cameras (e.g., visible spectrum cameras, infrared cameras, etc.), motion sensors, and/or other types of two-dimensional and/or three-dimensional capturing devices. The sensor data 118 can include image data, radar data, LIDAR data, and/or other data acquired by the vehicle sensor(s) 116. For example, the vehicle sensor(s) 116 can include a front-facing RGB camera mounted on top of the vehicle 102 and the sensor data 118 can include an RGB image depicting the surrounding environment of the vehicle 102. In addition, or alternatively, the vehicle sensor(s) 116 can include one or more LIDAR sensor(s) and the sensor data 118 can include one or more sparse sets of LIDAR measurements. Moreover, the vehicle 102 can also include other sensors configured to acquire data associated with the vehicle 102. For example, the vehicle 102 can include inertial measurement unit(s), wheel odometry devices, and/or other sensors. In some implementations, the sensor data 118 and/or map data 132 can be processed to select one or more target trajectories for traversing within the surrounding environment of the vehicle 102.

In addition to the sensor data 118, the autonomy computing system 130 can retrieve or otherwise obtain map data 132. The map data 132 can provide static world representations about the surrounding environment of the vehicle 102. For example, in some implementations, a vehicle 102 can exploit prior knowledge about the static world by building very detailed maps (HD maps) that represent not only the roads, buildings, bridges, and landmarks, but also traffic lanes, signs, and lights to centimeter accurate three-dimensional representations. More particularly, map data 132 can include information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other data that provides information that assists the vehicle 102 in comprehending and perceiving its surrounding environment and its relationship thereto.

The vehicle 102 can include a positioning system 114. The positioning system 114 can determine a current position of the vehicle 102. The positioning system 114 can be any device or circuitry for analyzing the position of the vehicle 102. For example, the positioning system 114 can determine a position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 110 and/or provided to a remote computing system. For example, the map data 132 can provide the vehicle 102 relative positions of the elements of a surrounding environment of the vehicle 102. The vehicle 102 can identify its position within the surrounding environment (e.g., across six axes, etc.) based at least in part on the map data 132. For example, the vehicle computing system 110 can process the sensor data 118 (e.g., LIDAR data, camera data, etc.) to match it to a map of the surrounding environment to get an understanding of the vehicle's position within that environment.

The autonomy computing system 130 can include a perception system 140, a prediction system 150, a motion planning system 160, and/or other systems that cooperate to perceive the surrounding environment of the vehicle 102 and determine a motion plan for controlling the motion of the vehicle 102 accordingly.

For example, the autonomy computing system 130 can obtain the sensor data 118 from the vehicle sensor(s) 116, process the sensor data 118 (and/or other data) to perceive its surrounding environment, predict the motion of objects within the surrounding environment, and generate an appropriate motion plan through such surrounding environment. The autonomy computing system 130 can communicate with the one or more vehicle control systems 120 to operate the vehicle 102 according to the motion plan.

The vehicle computing system 100 (e.g., the autonomy computing system 130) can identify one or more objects that are proximate to the vehicle 102 based at least in part on the sensor data 118 and/or the map data 132. For example, the vehicle computing system 110 (e.g., the perception system 140) can process the sensor data 118, the map data 132, etc. to obtain perception data 142. The vehicle computing system 110 can generate perception data 142 that is indicative of one or more states (e.g., current and/or past state(s)) of a plurality of objects that are within a surrounding environment of the vehicle 102. For example, the perception data 142 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class); the uncertainties associated therewith, and/or other state information. The perception system 140 can provide the perception data 142 to the prediction system 150, the motion planning system 160, and/or other system(s).

The prediction system 150 can be configured to predict a motion of the object(s) within the surrounding environment of the vehicle 102. For instance, the prediction system 150 can generate prediction data 152 associated with such object(s). The prediction data 152 can be indicative of one or more predicted future locations of each respective object. For example, the prediction system 150 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 152 can be indicative of the speed and/or acceleration at which the respective object is predicted to travel along its associated predicted motion trajectory. The prediction system 150 can output the prediction data 152 (e.g., indicative of one or more of the predicted motion trajectories) to the motion planning system 160.

The vehicle computing system 110 (e.g., the motion planning system 160) can determine a motion plan 162 for the vehicle 102 based at least in part on the perception data 142, the prediction data 152, and/or other data.

A motion plan 162 can include vehicle actions (e.g., planned vehicle trajectories, speed(s), acceleration(s), other actions, etc.) with respect to one or more of the objects within the surrounding environment of the vehicle 102 as well as the objects' predicted movements. For instance, the motion planning system 160 can implement an optimization algorithm, model, etc. that considers cost data associated with a vehicle action as well as other objective functions (e.g., cost functions based on speed limits, traffic lights, etc.), if any, to determine optimized variables that make up the motion plan 162. The motion planning system 160 can determine that the vehicle 102 can perform a certain action (e.g., pass an object, etc.) without increasing the potential risk to the vehicle 102 and/or violating any traffic laws (e.g., speed limits, lane boundaries, signage, etc.). For instance, the motion planning system 160 can evaluate one or more of the predicted motion trajectories of one or more objects during its cost data analysis as it determines an optimized vehicle trajectory through the surrounding environment. The motion planning system 160 can generate cost data associated with such trajectories. In some implementations, one or more of the predicted motion trajectories may not ultimately change the motion of the vehicle 102 (e.g., due to an overriding factor). In some implementations, the motion plan 162 may define the vehicle's motion such that the vehicle 102 avoids the object(s), reduces speed to give more leeway to one or more of the object(s), proceeds cautiously, performs a stopping action, etc.

The motion planning system 160 can be configured to continuously update the vehicle's motion plan 162 and a corresponding planned vehicle motion trajectory. For example, in some implementations, the motion planning system 160 can generate new motion plan(s) for the vehicle 102 (e.g., multiple times per second). Each new motion plan can describe a motion of the vehicle 102 over the next planning period (e.g., next several seconds). Moreover, a new motion plan may include a new planned vehicle motion trajectory. Thus, in some implementations, the motion planning system 160 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 102.

The vehicle computing system 110 can cause the vehicle 102 to initiate a motion control in accordance with at least a portion of the motion plan 162. A motion control can be an operation, action, etc. that is associated with controlling the motion of the vehicle. For instance, the motion plan 162 can be provided to the vehicle control system(s) 120 of the vehicle 102. The vehicle control system(s) 120 can be associated with a vehicle controller (e.g., including a vehicle interface) that is configured to implement the motion plan 162. The vehicle controller can, for example, translate the motion plan into instructions for the appropriate vehicle control component (e.g., acceleration control, brake control, steering control, etc.). By way of example, the vehicle controller can translate a determined motion plan 162 into instructions to adjust the steering of the vehicle 102 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 162 (e.g., by sending control signal(s), making the translated plan available, etc.). This can allow the vehicle 102 to autonomously travel within the vehicle's surrounding environment.

As shown in FIG. 1, the vehicle computing system 110 can include an image compression system 164 that is configured to generate compressed image data 166 and/or assist in generating compressed image data 166. Image compression system 164 can compress multiple images using one or machine-learned models including skip functions that are trained to propagate information between images. For example, the machine learned model(s) can extract information from one image in order to reduce the bitrate of another image when generating compressed image data for both images such that the overall bitrate for the images is reduced. The machine-learned image compression model can utilize parametric skip functions to enhance the compression of a second image based on disparity-warped features generated from a first image, such as a pair of stereo images that have at least partially overlapping fields of view. The model can utilize single image compression autoencoders that are enhanced with the parametric skip functions to feed fully differentiable, disparity-warped features at multiple levels to encoders and/or decoders for the second image. By passing multi-level information from the encoders and/or decoders for the first image, fewer bits can be stored for the second image. Additionally, in some examples, a probabilistic dependence between images codes for a first image and a second image can be modeled using a conditional entropy model. The conditional entropy model can capture a correlation between the two images to help reduce the joint entropy of the two image codes. In this manner, the joint bitrate of the two image codes can be reduced. By utilizing parametric skip functions and a conditional entropy model, image compression system 164 can reduce the bitrates of images to provide an efficient use of storage space. For example, image compression system 164 can be used by autonomous vehicle 102 to efficiently store image data associated with a stereo pair of image sensors used as part of vehicle computing system 110 of the vehicle.

Although many examples are described herein with respect to autonomous vehicles, the disclosed technology is not limited to autonomous vehicles. In fact, any object capable of collecting sensor data and map data can utilize the technology described herein for generating a target trajectory. For example, a non-autonomous vehicle may utilize aspects of the present disclosure to generate a target trajectory for an operator of the non-autonomous vehicle, notify the vehicle operator of the target trajectory, and take precautionary measures based on the identified target trajectory. Likewise, a smart phone with one or more cameras, a robot, augmented reality system, and/or another type of system can utilize aspects of the present disclosure to generate target trajectories.

Figure 2:
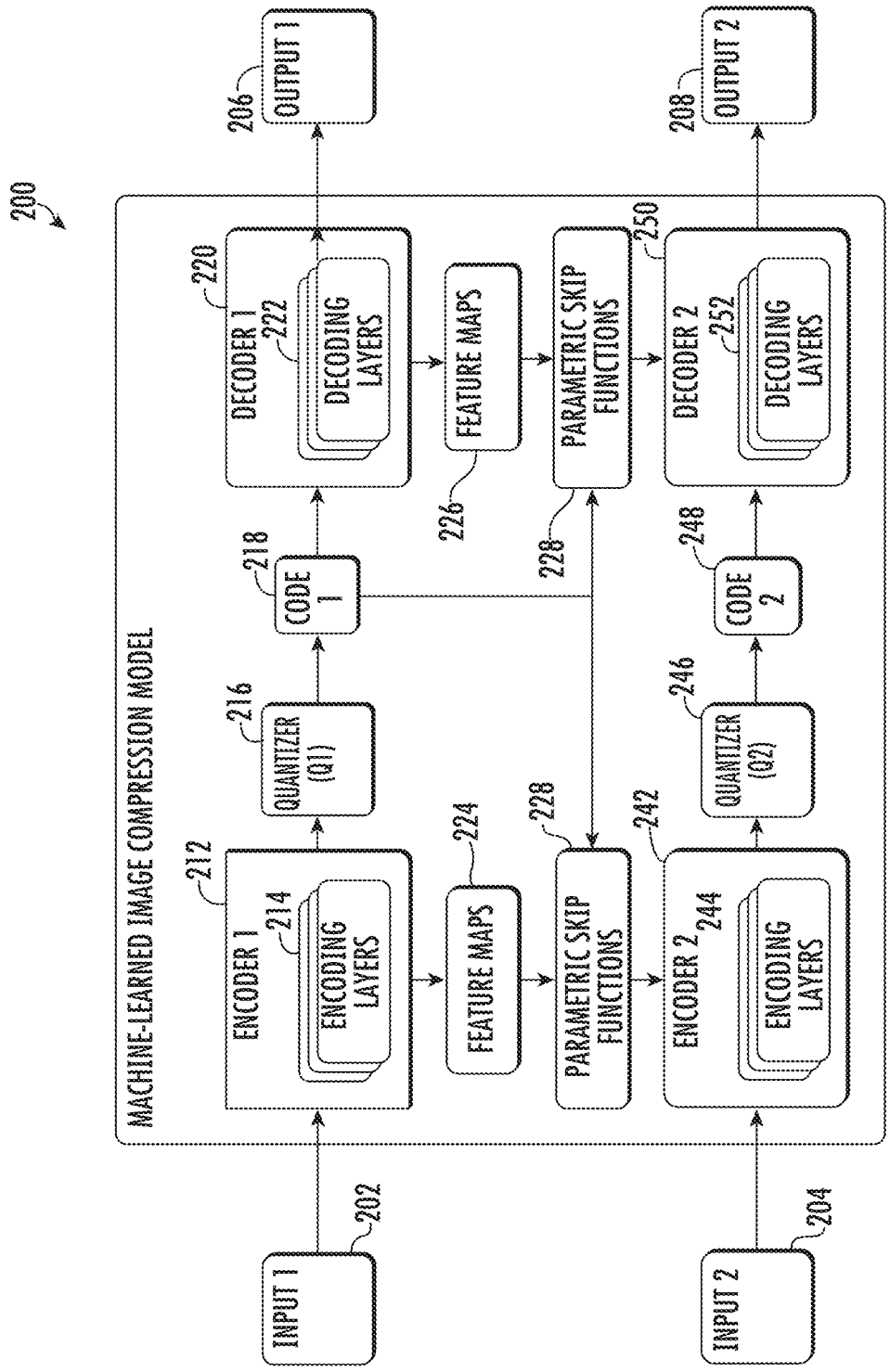
FIG. 2 depicts an example computing environment including a machine-learned image compression system according to example embodiments of the present disclosure.

FIG. 2 depicts an example computing environment including a machine-learned image compression system 200 according to example embodiments of the present disclosure. Image compression system 200 includes a machine-learned image compression model 210 that is configured to jointly compress two or more inputs such as a first image 202 and a second image 204 having at least partially overlapping fields of view. Although two images are shown by way of example, model 210 may include additional encoders/decoders to provide image compression for three or more images having at least partially overlapping fields of view. Image compression model 210 can extract information from image 202 in order to reduce the bitrate in the second image 204, such that the total bitrate for the pair is lower than the result of single-image compression. A two-stream deep encoder-decoder network is provided. Image 202 is passed to an encoder 212 where it is propagated through one or more encoding layers 214. An output of encoder 212 is provided to a quantizer 216 to generate a discretized image code 218 such as a latent code. The image code 218 is provided as an input to a set of parametric skip functions 228 for encoding and decoding.

The set of one or more parametric skip function(s) 228 can be provided in order to propagate information from feature maps 224 generated by the encoder 212 from the first image 202. In some examples, a parametric skip function can be provided for each encoding layer 214 except for a first encoding layer of encoder 212. The propagated information from the feature maps 224 is provided to encoder 242.

Image 204 is passed to encoder 242 where it is propagated through one or more encoding layers 244 using the information provided by the parametric skip functions 228. An output of encoder 242 is provided to a quantizer 246 to generate a discretized image code 248 such as a latent code. By utilizing parametric skip functions, a reduced number of bits can be stored for the second image code 248. A conditional entropy model can be used to model the correlation between the two image codes of the two images to reduce the joint entropy, and hence the joint bitrate, of the two image codes.

The images can be decoded by passing image code 218 to decoder 220 which reconstructs the image from the latent image code as an output or output image 206. Image code 248 is passed to decoder 250 which reconstructs the image from the latent image code as an output or output image 208. A set of or more parametric skip function(s) 228 can be provided in order to propagate information from the feature maps 226 generated by the decoder 220 from the first image 202. In some examples, a parametric skip function can be provided for each decoding layer 222 except for a first decoding layer of decoder 220.

Figure 3:
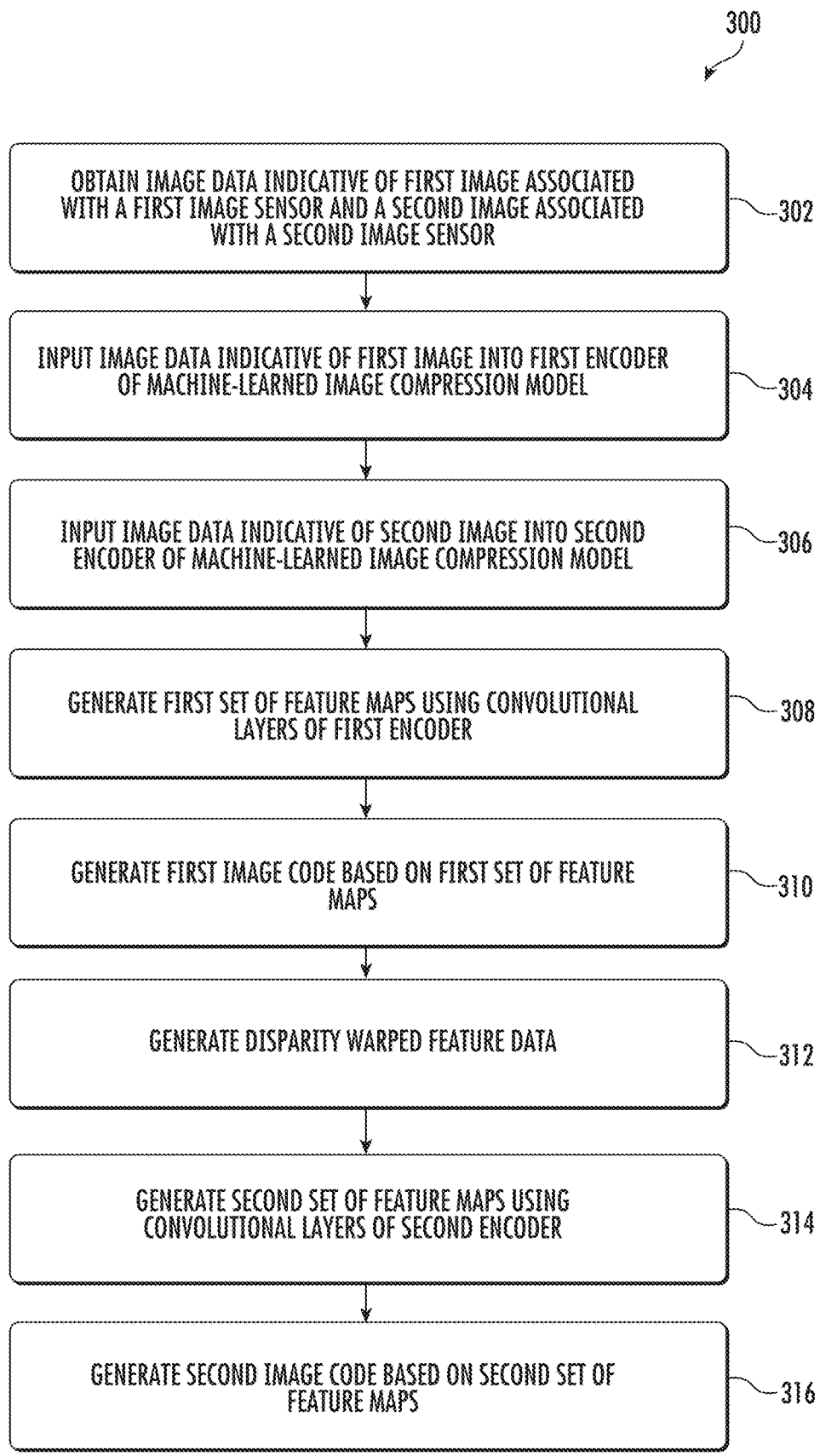
FIG. 3 depicts a flowchart illustrating an example method for encoding image data using a machine-learned image compression system according to example embodiments of the present disclosure.

FIG. 3 depicts a flowchart illustrating an example method 300 for encoding image data using a machine-learned image compression system according to example embodiments of the present disclosure. One or more portions of method 300 (and the other methods described herein such as method 350 of FIG. 4, method 550 of FIG. 8, and/or method 700 of FIG. 11) can be implemented by one or more computing devices such as, for example, one or more computing devices of vehicle computing system 100 of FIG. 1 or computing system 1000 of FIG. 15. One or more portions of method 300 can be implemented as an algorithm on the hardware components of the devices described herein (e.g., as in FIGS. 1, 14, and/or 15) to, for example, generate compressed image data. In example embodiments, method 300 may be performed by an image compression system 164 implemented using one or more computing devices of a vehicle computing system (e.g., 200).

At 302, method 300 can include obtaining image data indicative of a first image associated with a first image sensor and a second image associated with a second image sensor. It is noted that while embodiments are described with respect to image sensors and image data the disclosed techniques may be equally applicable to other types of sensor data such as radar data, lidar data, etc. Additionally, although an example is provided with respect to two images and two images sensors, other examples may include additional images from additional image sensors.

At 304, method 300 can include inputting the image data indicative of the first image into a first encoder of a machine learned image compression model. At 306, method 300 can include inputting image data indicative of the second image into a second encoder of the machine learned image compression model.

At 308, method 300 can include generating a first set of feature maps using convolutional layers of the first encoder. The first encoder can include a first series of convolutional layers configured to generate a first series of respective feature maps based at least in part on the first image.

At 310, method 300 can include generating a first image code based on the first set of feature maps generated by the first encoder. The first encoder can be configured to generate the first image code based at least in part on first image data indicative of a first image associated with a first image sensor.

At 312, method 300 can include generating disparity warped feature data from the first set of feature maps. In example embodiments, the disparity warped feature data may be generated by one or more parametric skip functions. For example, a plurality of respective parametric skip functions can be associated with at least a subset of convolutional layers of the second series of convolutional layers. The parametric skip functions can generate the disparity-warped feature data based at least in part on disparity associated with the first series of respective feature maps and a second series of respective feature maps in example embodiments.

At 314, method 300 can include generating a second set of feature maps using convolutional layers of the second encoder. The second encoder can include a second series of convolutional layers configured to generate a second series of respective feature maps based at least in part on the second image and disparity-warped feature data associated with the first image.

Figure 4:
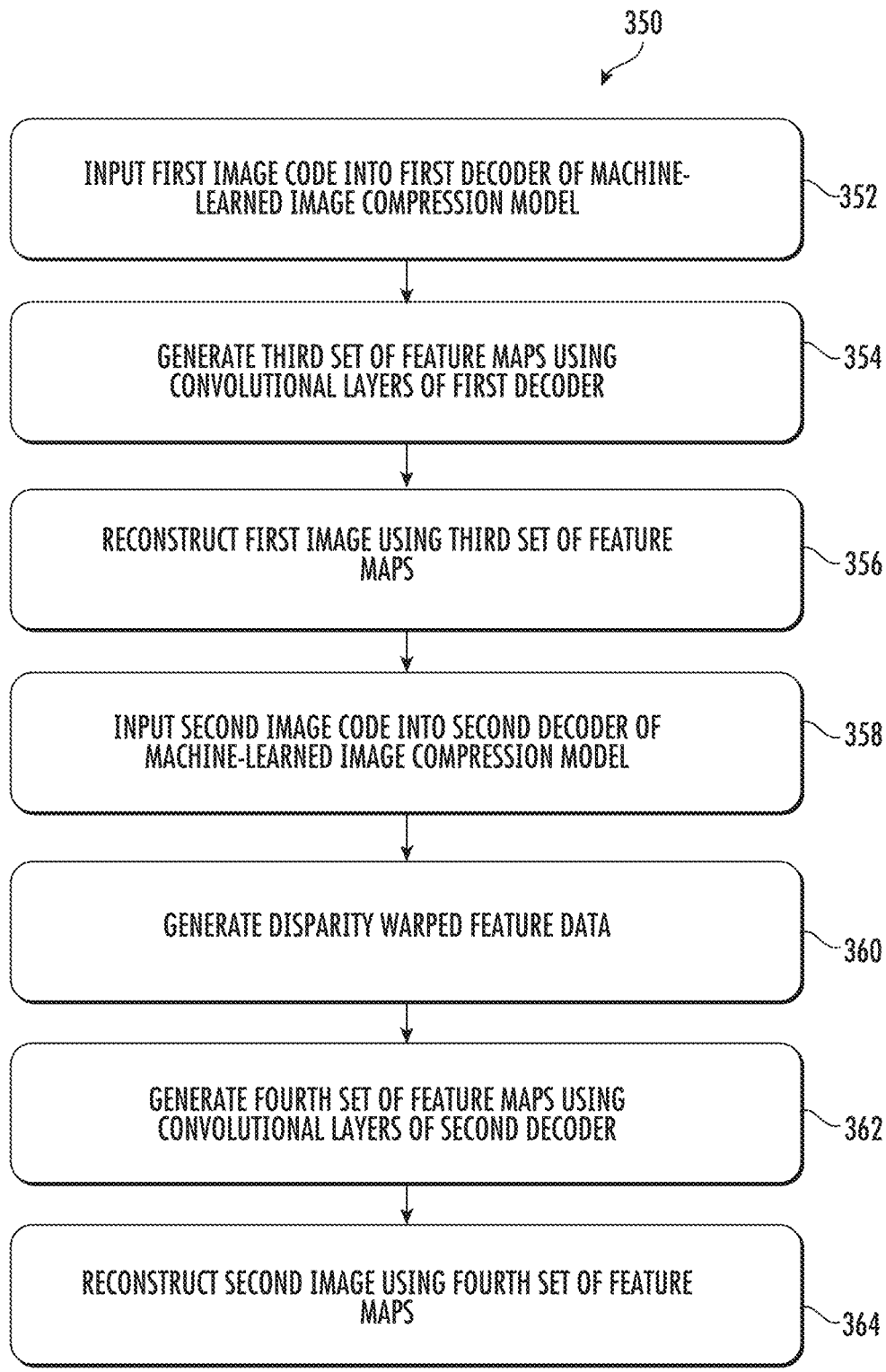
FIG. 4 depicts a flowchart illustrating an example method for decoding image data using a machine-learned image compression system according to example embodiments of the present disclosure.

At 316, method 300 can include generating a second image code based on the second set of feature maps generated by the second encoder. The second encoder can be configured to generate a second image code based at least in part on second image data indicative of a second image associated with a second image sensor FIG. 4 depicts a flowchart illustrating an example method 350 for decoding image data using a machine-learned image compression system according to example embodiments of the present disclosure.

At 352, method 350 can include inputting a first image code into a first decoder of a machine learned image compression model.

At 354, method 350 can include generating a third set of feature maps using convolutional layers of the first decoder. The first decoder can include a third series of convolutional layers configured to generate a third series of respective feature maps based at least in part on the first image code.

At 356, method 350 can include reconstructing a first image from the third set of feature maps. The first decoder can be configured to generate first reconstructed image data including a reconstruction of the first image based at least in part on the first image code.

At 358, method 350 can include inputting a second image code into a second decoder of the machine learned image compression model. At 360, method 350 can include generating disparity warped feature data from a set of feature maps generated by the second decoder. The second decoder can include a fourth series of convolutional layers configured to generate a fourth series of respective feature maps based at least in part on the second image code and the disparity-warped feature data associated with the first image.

At 362, method 350 can include reconstructing the second image using the fourth set of feature maps. The second decoder can be configured to generate second reconstructed image data including a reconstruction of the second image based at least in part on the second image code. Additional images can be reconstructed using similar techniques.

Figure 5:
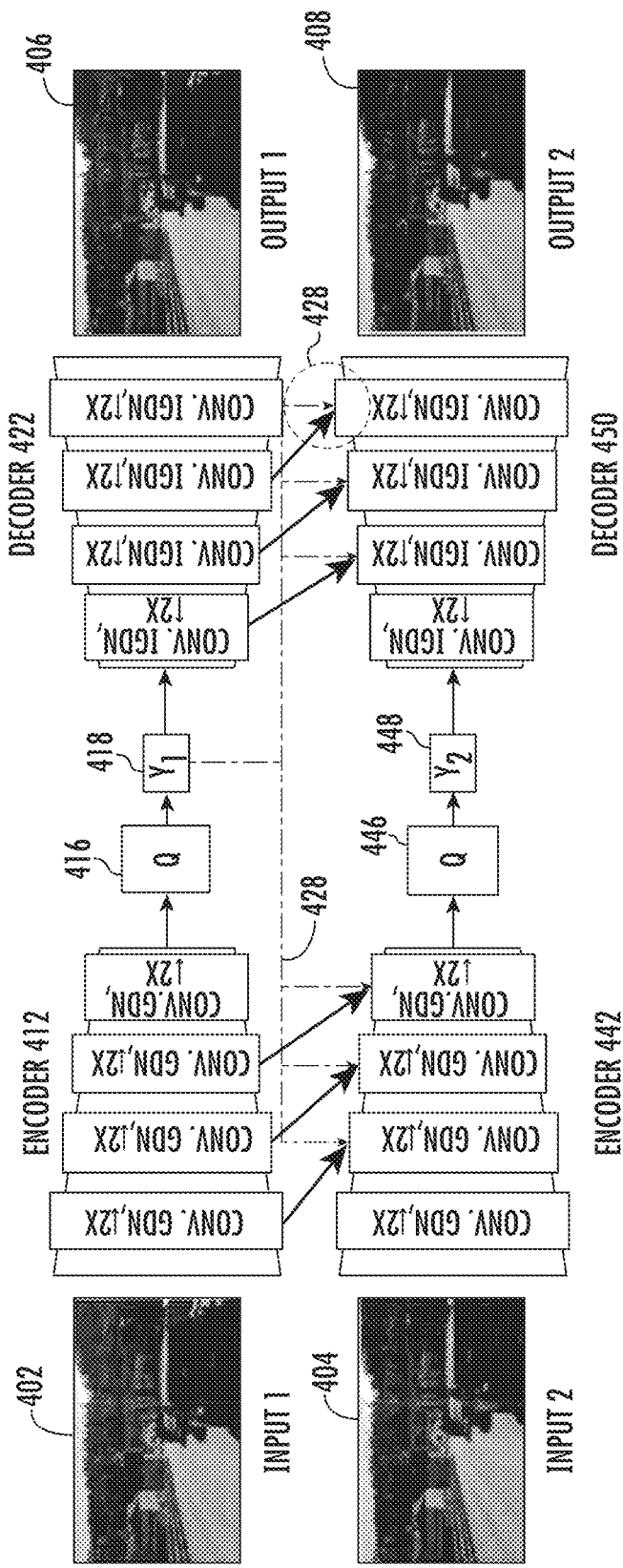
FIG. 5 depicts an example computing environment including a computer architecture of a machine-learned image compression model according to example embodiments of the present disclosure.

FIG. 5 depicts an example computing environment including a computer architecture of a machine-learned image compression model 400 according to example embodiments of the present disclosure. Machine-learned compression model 400 is an example of a machine-learned compression model 210 depicted in FIG. 2.

Machine-learned image compression model 400 includes a first encoder 412 configured to encode a first image 402 into an image code 418 such as a first latent image code in a latent space and a second encoder 442 configured to encode a second image 404 into a second image code 448 such as a second latent image code in the latent space. The first encoder 412 can include a series of convolutional layers 414 where each layer generates a respective feature map based on the first image 402. In some examples, encoder 412 is implemented with a series of or down sampling convolutions (by 2×) and Generalized Divisive Normalization (GDN) layers. In example embodiments, encoder 412 can generate a floating-point output from before downsampling convolutional and GDN layers. Quantizer 416 can apply a rounding function to the floating-point output of the encoder to output image code 418 as a discrete code representation.

The second encoder 442 can include a second series of convolutional layers 444 where each layer generates a respective feature map based on the second image 404 and disparity-warped feature data associated with the first image 402 and the second image 404. The disparity-warped feature data can be generated by a set of parametric skip functions 428 for at least a subset of the convolutional layers of the second encoder 442. In some examples, encoder 442 can be implemented with a series of four down sampling convolutions (by 2×) and GDN layers. Encoder 442 can generate a floating-point output from the four down sampling convolutional and GDN layers. Quantizer 416 can apply a rounding function to the floating-point output of the encoder to output image code 418 as a discrete code representation.

A set of parametric skip functions 428 is provided for the second encoder 442. The set of parametric skip functions 428 can include a respective parametric skip function for each convolutional layer of a subset of the convolutional layers for the second encoder. In this example, the subset can include each convolutional layer except the first convolutional layer of the series of convolutional layers of the second encoder 442. Each parametric skip function can propagate image information from the first encoder to the second encoder. The parametric skip functions can exploit the correlation between the feature maps of the two images at one or more levels of the encoder. By estimating the disparity between each pair of feature maps for a given level, the image compression model can warp features from the first feature map associated with the first image to the second feature map associated with the second image. By warping features, the pixel-level alignment between the two feature maps can be improved which can enable the model to accurately pass information from the first feature map to the corresponding spatial positions of the second feature map.

Machine-learned image compression model 400 includes a first decoder 420 configured to provide an output including a reconstruction 406 of the first image 402 from the first image code 418 and a second decoder 450 configured to provide an output including a reconstruction 408 of the second image 404 using the second image code 448. Decoder 420 includes a series of convolutional layers 422 where each layer generates a respective feature map based on the first image code 418. Decoder 450 includes a second series of convolutional layers 452 where each layer generates a respective feature map based on the second image code 448 and disparity-warped feature data associated with the first image code 418 and the second image code 448. The disparity-warped feature data can be generated by a set of parametric skip functions 228 for at least a subset of the convolutional layers of the second decoder.

Figure 6:
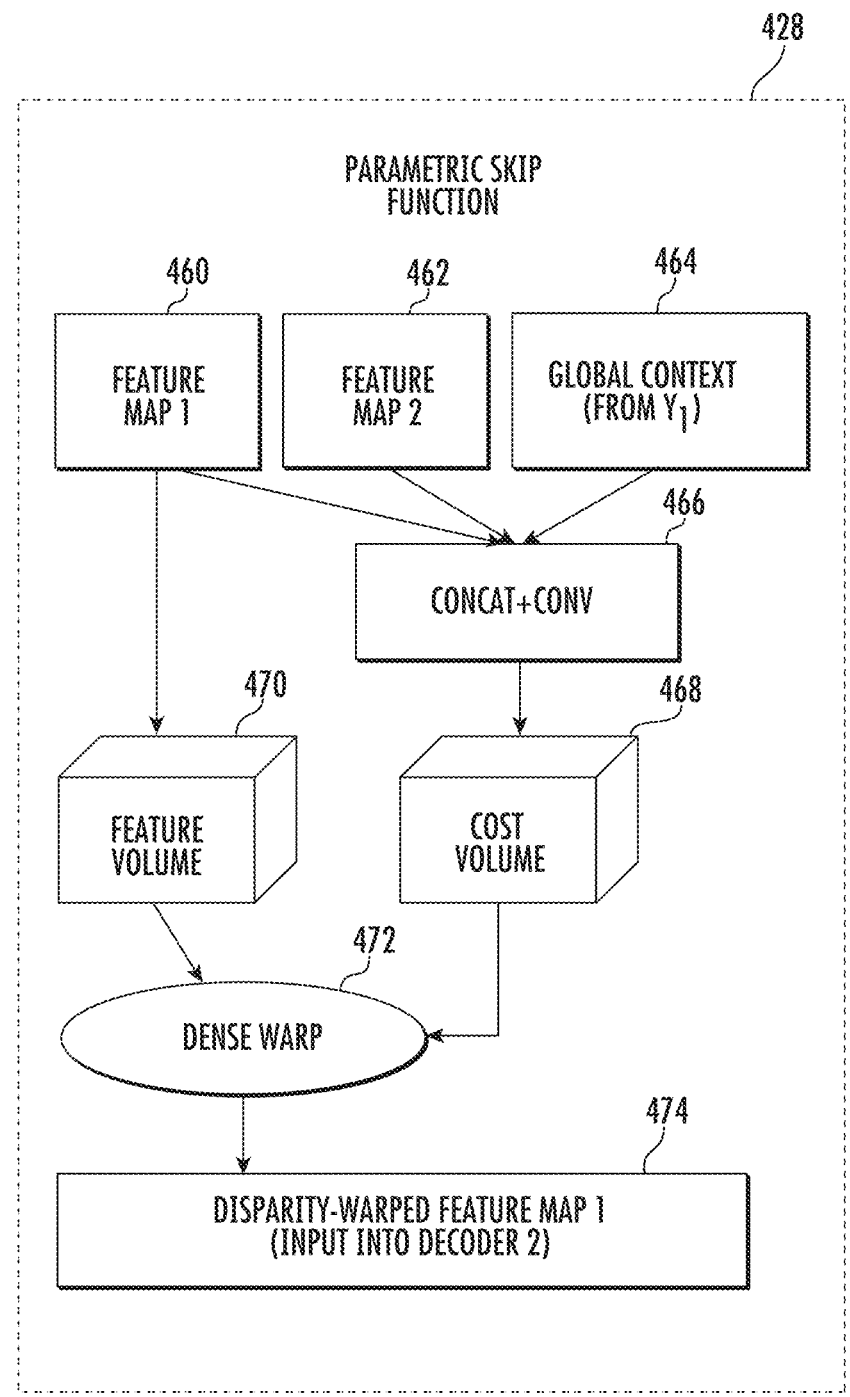
FIG. 6 depicts an example block diagram of a parametric skip function of a machine-learned image compression model according to example embodiments of the present disclosure.

FIG. 6 depicts a block diagram of an example parametric skip function 428 of a machine-learned image compression model according to example embodiments of the present disclosure. Parametric skip function 428 is an example of a parametric skip function as shown in FIG. 5. The parametric skip function 428 for a particular level of an encoder can include three inputs. In FIG. 6, the first input 460 is a first feature map from the previous convolutional layer of the first encoder (e.g., for image 1). The second input 462 is a second feature map from the previous convolutional layer of the second encoder (e.g., for image 2). The third input is the first image code, provided by the Global Context Encoding Unit 464 (from $y_1$). Similar parametric skip functions may be provided for image compression of three or more images. The parametric skip function can generate disparity-warped feature data based at least in part on disparity between the first image and the second image. The disparity-warped feature data can include disparity-warped features generated by warping features from the first feature map to the second feature map. By way of example, the disparity-warped features can be generated and provided to all or a portion of the levels of the encoder for the second image. Additionally or alternatively, the disparity-warped feature data can include predicted features for the feature map corresponding to the second image.

The parametric skip function for a particular level of the second encoder/decoder can include a fully convolutional global context encoding unit 464, a concatenation and convolution unit 466, a stereo cost volume estimation unit 468, a feature volume unit 470, a feature warping unit 472, and an aggregation function unit 474. The global context encoding unit 464 can encode the image code of the first image to a feature descriptor in order to capture global context information of the first image contained in its latent code. The global context feature can be shared across all the different levels of the image compression system. The stereo cost volume estimation unit 468 of the skip function can estimate a cost volume from the inputs to the parametric skip function including the first feature map, the second feature map, and the global context. The dense feature warping unit 472 can warp features from the first image to the second image. In some examples, the feature warping unit can generate warped features which better align with the feature map of the second image. The aggregation function unit 474 can be configured to predict the feature map of the second image which can be provided as the final output of the parametric skip function.

Similarly, the parametric skip function for a particular level of the second decoder can include three inputs. The first input can receive a first feature map from the previous convolutional layer of the first decoder. The second input can receive a second feature map from the previous convolutional layer of the second decoder. The third input can receive the first image code. The parametric skip function can generate disparity-warped feature data based at least in part on disparity between the first image and the second image. The disparity-warped feature data can include disparity-warped features generated by warping features from the first feature map to the second feature map. By way of example, the disparity-warped features can be generated and provided to all or a portion of the levels of the decoder for the second image.

Figure 7:
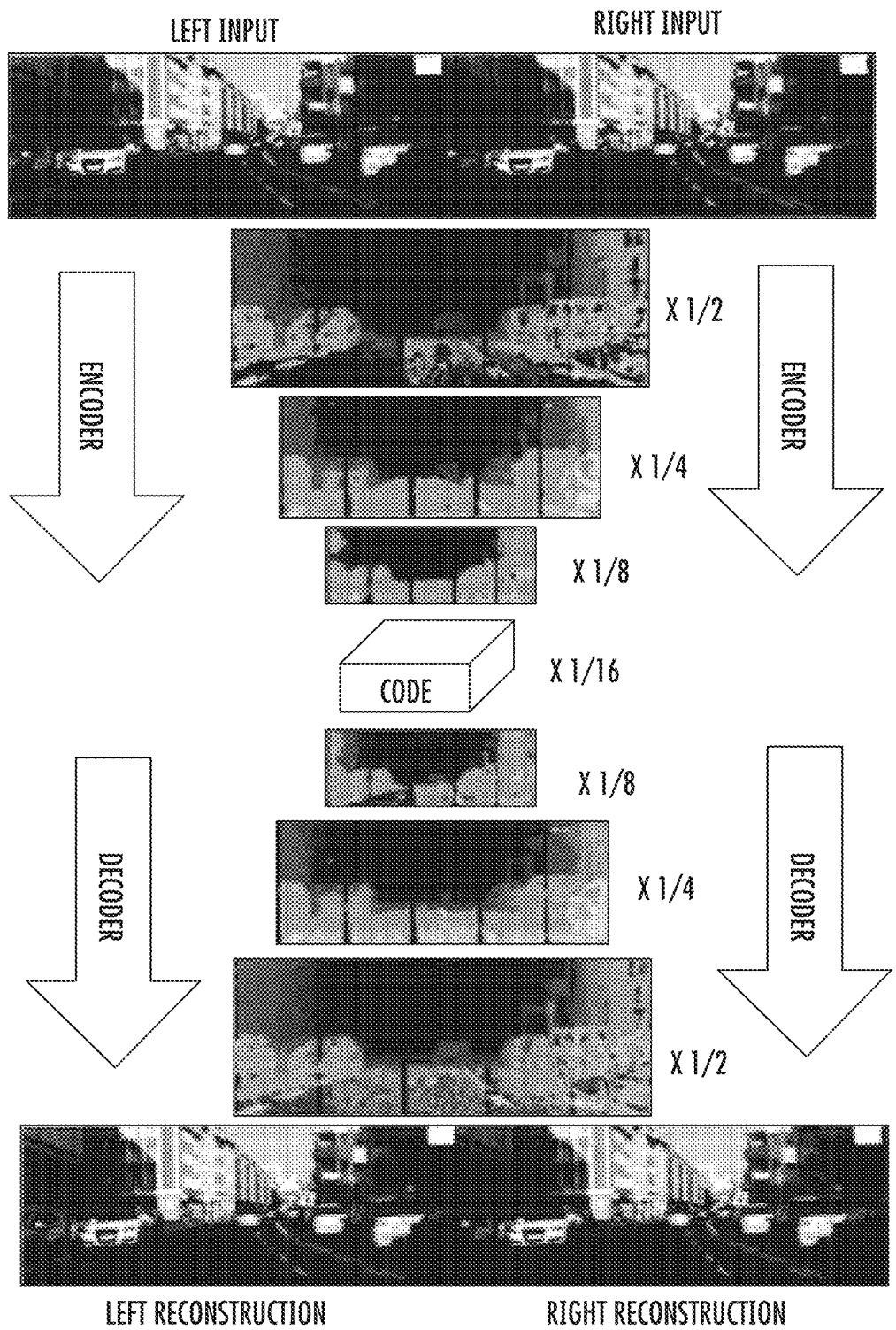
FIG. 7 depicts an example of joint image compression and reconstruction using a machine-learned image compression model according to example embodiments of the present disclosure.

FIG. 7 depicts an example of joint image compression and reconstruction using a machine-learned image compression model according to example embodiments of the present disclosure. FIG. 7 depicts a visualization of the disparity volumes at each resolution level in the encoder/decoder, by taking the mode over the disparity dimension for each feature pixel. Tiling affects may be inherently due to unsupervised training on crops.

Figure 8:
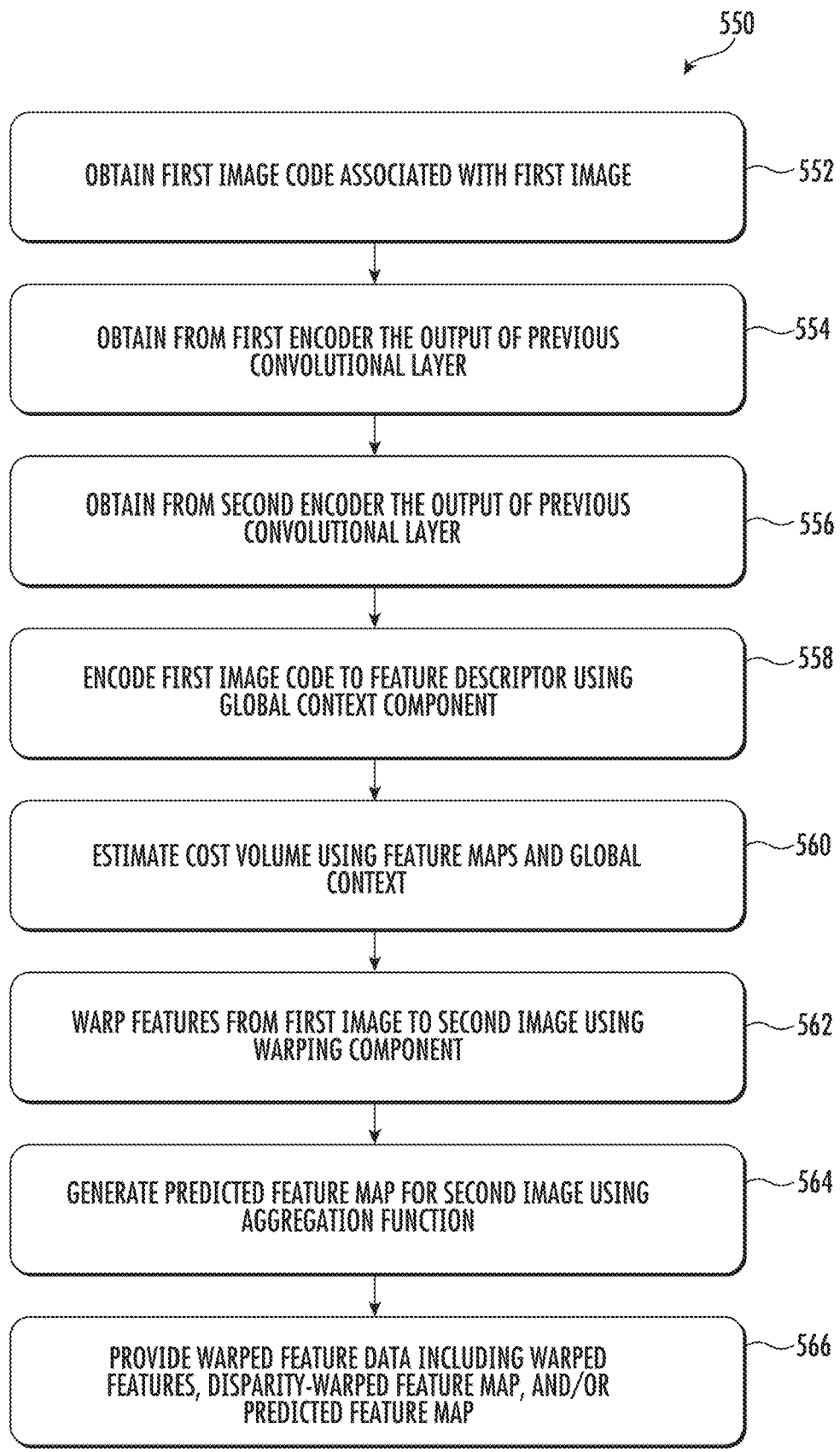
FIG. 8 depicts a flowchart illustrating an example method for generated disparity-warped featured data by a parametric skip function of a machine-learned image compression model according to example embodiments of the present disclosure.

FIG. 8 depicts a flowchart illustrating an example method 550 for generated disparity-warped featured data by a parametric skip function of a machine-learned image compression model according to example embodiments of the present disclosure. FIG. 8 will be described with respect to an of a pair of stereo images that are to be compressed. Intuitively, if the overlapping field of view between the stereo pair is very high, then the bitrate of the combined latent code can be lower than the sum of the bitrates if the images are compressed separately. A pair of rectified stereo images can be denoted as $x_1, x_2$ and $H(x_1, x_2)$ can be the entropy of the stereo pair. Given the fact that the content of the two images is highly correlated, the mutual information can be defined as set forth in Equation 1:

$$I(x_1, x_2) = H(x_1) + H(x_2) - H(x_1, x_2) \geq 0.$$  Equation 1

With the observation set forth in Equation 1, an example approach can include a single compression model that jointly compresses the two stereo images of a pair.

Referring to FIG. 8, at 552, method 550 can include obtaining a first image code (e.g., $9_1$). At 554, method 500 can include obtaining from a first encoder the output of a previous convolutional layer of the first encoder. In order to compute the feature map of the second image at level t, each skip function takes as input its previous layer's feature $h_2^{t-1}$.

At 556, method 550 can include obtaining from a second encoder the output of a previous convolutional layer of the second encoder. In order to compute the feature map of the second image at level t, each skip function additionally takes as input the previous layer feature $h_1^{t-1}$ from the first image.

At 558, method 500 can include encoding the first image code into a first feature descriptor using a global context component. Each skip function unit can include four parts. First, a fully convolutional global context encoding component can encode the first image's latent code to a feature descriptor di. This can capture global context information of the first image, contained in its latent code. The global context feature can be shared across all the different levels.

At 560, method 550 can include estimating a cost volume using feature maps and the global context component. A stereo cost volume component can estimate a cost volume $c^{t-1}$ from the input of the first feature map, the second feature map, and the global context. The cost volume size can be $C \times H^{t-1} \times W^{t-1}$, where C is the maximum disparity and $H^{t-1}$ and $W^{t-1}$ are the height/width of $h_1^{t-1}$. A softmax layer can be applied to ensure the cost is normalized along the disparity dimension per pixel. Each value in the cost volume can be seen as a probability/confidence measure of the correct disparity at that coordinate.

At 562, method 550 can include warping features from the first image to the second image using a warping component. The cost volume can be used to densely warp the feature from the first image to the second. Particularly, for each pixel i, the new feature vector can be computed through a weighted sum of feature vectors across all the disparity values in the disparity range as set forth in Equation 2:

$$g_{2,i}^{t-1} = \sum_{d=0}^{C} c_{d,i} \cdot h_{1,(i,d)}^{t-1}. \quad \text{Equation 2}$$

In Equation 2, $c_{d,i}$ represents the cost of disparity d at pixel i. The pixel index that is d pixels to the right of pixel i is represented by (i, d). The volumetric warping provides a warped feature map $g_2^{t-1}$ which better aligns with the feature map of the second image. This can also be seen as an attention mechanism for each pixel i into the first image's feature map within a disparity range. Compared to regressing a single disparity map and warping with bilinear sampling, this design allows more flexible connections between the target pixel and a range of pixels from the source image.

At 564, method 550 can include generating a predicted feature map for the second image using an aggregation function. An aggregation function can be used to predict the feature map as the final output of the parametric skip function as set forth in Equation 3:

$$h_2^t = a(g_2^{t-1}, h_2^{t-1}). \quad \text{Equation 3}$$

In Equation 3, $g_{2,i}^{t-1}$ represents the volumetric warped feature from the first image and $h_2^{t-1}$ represents the previous layer's feature from the second image.

In accordance with example embodiments, the aggregation function $h_2^t = a(g_2^{t-1}, h_2^{t-1})$ can be established on the basis that since $g_2^{t-1}$ and $h_2^{t-1}$ have the same spatial resolution, they can be concatenated along the channel dimension. A downsampling/upsampling convolution can be applied as part of the second image's encoder/decoder.

At 566, method 550 can include providing warped feature data including warped features, disparity warped feature map, and/or a predicted feature map.

The entropy of the quantized code can be accurately modeled to navigate the rate-distortion trade-off, as entropy can be a tight lower bound of bitrate. There can exist a correlation between the latent codes of the two images, given the highly correlated image content. In order to exploit these relationships, a joint entropy model can be provided that includes neural networks to estimate the joint distribution of the code. In order to maintain differentiability while mimicking the effect of rounding error during quantization, a noisy version of y can be considered as input: where.

The joint distribution $p(\bar{y}_1, \bar{y}_2; \theta)$ can be modeled, taking into account the dependence of $\bar{y}_2$ on $\bar{y}_1$. Side information can be included as hyperpriors, $\bar{z}_1, \bar{z}_2$ whose purpose is to reduce the entropy of $\bar{y}_1, \bar{y}_2$. Note that $\bar{z}_1, \bar{z}_2$ can be derived from $\bar{y}_1, \bar{y}_2$ respectively during encoding and can also be counted in the bitstream. Thus, the joint probability of $\bar{y}_1, \bar{y}_2, \bar{z}_1, \bar{z}_2$ can be factorized as set forth in Equation 4:

$$p(\bar{y}_1, \bar{y}_2, \bar{z}_1, \bar{z}_2; \theta) = p(\bar{y}_2 | \bar{y}_1, \bar{z}_2; \theta_{\bar{y}_2}) p(\bar{y}_1 | \bar{z}_1; \theta_{\bar{y}_1}) p(\bar{z}_2; \theta_{\bar{z}_2}) p(\bar{z}_1; \theta_{\bar{z}_1}). \quad \text{Equation 4}$$

In Equation 4, $p(\bar{y}_1 | \bar{z}_1; \theta_{\bar{y}_1})$ denotes the probability of the first image code and $p(\bar{y}_2 | \bar{y}_1, \bar{z}_2; \theta_{\bar{y}_2})$ denotes the probability of the second image code, which is conditioned on the first image. The full set of parameters for each univariate distribution are represented by $\theta_{\bar{y}_2}, \theta_{\bar{y}_1}, \theta_{\bar{z}_2}, \theta_{\bar{z}_1}$. All models can be factorized into the product of each individual code's distribution under the full independence and conditional independence assumptions set forth in Equations 5, 6, 7, and 8:

$$p(\bar{z}_1; \theta_{\bar{z}_1}) = \prod_i p_{1,i}(\bar{z}_{1,i}; \theta_{\bar{z}_1}); \quad \text{Equation 5}$$

$$p(\bar{z}_2; \theta_{\bar{z}_2}) = \prod_i p_{2,i}(\bar{z}_{2,i}; \theta_{\bar{z}_2}); \quad \text{Equation 6}$$

$$p(\bar{y}_1 | \bar{z}_1; \theta_{\bar{y}_1}) = \prod_i p_{1,i}(\bar{y}_{1,i} | \bar{z}_1; \theta_{\bar{y}_1}); \text{ and} \quad \text{Equation 7}$$

$$p(\bar{y}_2 | \bar{y}_1, \bar{z}_2; \theta_{\bar{y}_2}) = \prod_i p_{2,i}(\bar{y}_{2,i} | \bar{y}_1, \bar{z}_2; \theta_{\bar{y}_2}). \quad \text{Equation 8}$$

In some instances, directly modeling a probability density function (PDF) with a deep parametric function may not be the best option for PDFs with discontinuous shapes, e.g., a uniform distribution between [−0.5, 0.5]. This can potentially restrict the power of an entropy model in some instances. Accordingly, in some examples, probabilities can be modeled as an area under the cumulative density function (CDF) as opposed to a point on the PDF. Hyperprior models $p_i(\bar{z}_i; \theta_{\bar{z}})$ can be designed as set forth in Equation 9:

$$p_i(\bar{z}_i; \theta_{\bar{z}}) = (q_i * u)(\bar{z}_i). \quad \text{Equation 9}$$

In Equation 9, $u(\tau)=1$ if $|\tau|<0.5$. Otherwise, $u(\tau)=0$ and $*$ is the convolution between two functions. Accordingly, the relationships set forth in Equation 10 can be defined:

$$p_i(\bar{z}_i; \theta_{\bar{z}}) = \int_{-\infty}^{\infty} q_i(\tau; \theta_{\bar{z}}) u(\bar{z}_i - \tau) d\tau \quad \text{Equation 10}$$
$$= \int_{\bar{z}_i - 0.5}^{\bar{z}_i + 0.5} q_i(\tau; \theta_{\bar{z}}) d\tau$$
$$= c_i(\bar{z}_i + 0.5; \theta_{\bar{z}}) - c_i(\bar{z}_i - 0.5; \theta_{\bar{z}})$$

In Equation 10, $c_i(\bar{z}_i; \theta_{\bar{z}})$ can represent the cumulative density function (CDF) of some underlying PDF q. This intuitively means that $p_i(\bar{z}_i; \theta_{\bar{z}})$ can be defined as an area under the CDF rather than directly as the PDF. A neural network can be used to directly model $c_i(\bar{z}_i; \theta_{\bar{z}})$. This approach can have better capacity to model steep edge PDFs, since even for a steep edged PDF, the CDF is still continuous.

A similar approach can be followed to model the conditional factorized probabilities for $\bar{y}_1, \bar{y}_2$. The model for $\bar{y}_2$ can first be highlighted as set forth in Equation 11:

$$p_{2,i}(\bar{y}_{2,i} | \bar{y}_1, \bar{z}_2; \theta_{\bar{y}_2}) = (q_{2,i} * u)(\bar{y}_{2,i}). \quad \text{Equation 11}$$

Each individual pixel $q_{2,i}$ PDF can be modeled as a Gaussian mixture model (GMM) as set forth in Equation 12:

$$q_{2,i}(\bar{y}_1, \bar{z}_2) = \sum_k w_{ik} \mathcal{N}(\mu_{ik}, \sigma_{ik}^2)). \quad \text{Equation 12}$$

In Equation 12, $w_{ik}, \mu_{ik}, \sigma_{ik}^2$ are the distribution parameters depending on $\bar{y}_1, \bar{z}_2$, and $\theta_{\bar{y}_2}$. The convolution can be rewritten as the difference between CDFs as in Equation 10. The CDF of a GMM is generally computed numerically in most computational frameworks, while the derivative is analytical. Thus a function can be learned that predicts parameters $w_{ik}$, $\mu_{ik}$, $\sigma_{ik}^2$ given $\bar{y}_1$, $\bar{z}_2$ with $\theta_{\bar{y}_2}$ as learnable parameters, instead of modeling the CDF value directly as in the hyperprior entropy model. A mixture model can increase performance slightly thanks to its stronger capacity compared to a single Gaussian. Finally, the model for $\bar{y}_1$ follows the same GMM formulation; however given that $\bar{y}_1$ is decoded first, $\bar{z}_1$ can be provided as input only, not $y_2$, as set forth in Equation 13:

$$p_{1,i}(\bar{y}_{1,i}|\bar{z}_1;\theta_{\bar{y}1})=(q_{1,i}*u)(\bar{y}_{1,i}). \quad \text{Equation 13}$$

In accordance with some example embodiments, a machine-learned image compression model can be trained end-to-end to minimize an objective function as set forth in Equation 14:

$$\ell + \beta R = \mathbb{E}_{x_1, x_2 \sim p_x} \left[ \underbrace{\|x_1 - \hat{x}_1\|_2^2}_{\text{Distortion (Img. 1)}} + \underbrace{\|x_2 - \hat{x}_2\|_2^2}_{\text{Distortion (Img. 2)}} \right] + \\ \beta \mathbb{E}_{x_1, x_2 \sim p_x} \left[ \underbrace{-\log_2 p(\bar{y}_1, \bar{z}_1; \theta)}_{\text{Rate (Code 1)}} \underbrace{-\log_2 p(\bar{y}_2, \bar{z}_2 \mid y_1; \theta)}_{\text{Rate (Code 2)}} \right]. \quad \text{Equation 14}$$

In Equation 14, the first term encodes reconstruction quality of both images and the second term is the bitrate term with the rate predicted by the entropy model. A target bitrate can be enforced for a given model by modifying the rate function as set forth in Equation 15:

$$R = \max(\mathbb{E}_{x_1, x_2 \sim p_x}[-\log_2 p(\bar{y}_1, \bar{y}_2, \bar{z}_2; \theta)], H_t). \quad \text{Equation 15}$$

In Equation 15, $H_t$ represents the desired target entropy calculated from the target bitrate.

An example implementation including an architecture of an encoder/decoder can include a number of channels for each intermediate layer in both the encoder/decoder of each image that is set to N. The number of channels of each of the two codes, $\bar{y}_1$, $\bar{y}_2$ can be set to M. For the lower bitrates (<0:7), N can be set as N=100 and M can be set as M=140. In some examples, setting a smaller bottleneck may not unacceptably affect model performance and may allow the models to train much faster. For the higher bitrates (0:7) in some examples, N can be set to N=192 and M can be set as M=256.

A skip function architecture in accordance with example embodiments can implement four components. A global context feature can be predicted from the code of image 1 ($\bar{y}_1$) in order to capture global information from image 1. Then, at each level of the encoder/decoder, a stereo cost volume can be predicted from $h_1^{t-1}$, $h_2^{t-1}$—the feature maps of image 1 and 2 from the previous layer—as well as the global context feature. The cost volume can be used to densely warp $h_1^{t-1}$ from image 1 to image 2, and finally aggregate this warped feature with $h_2^{t-1}$.

Figure 9:
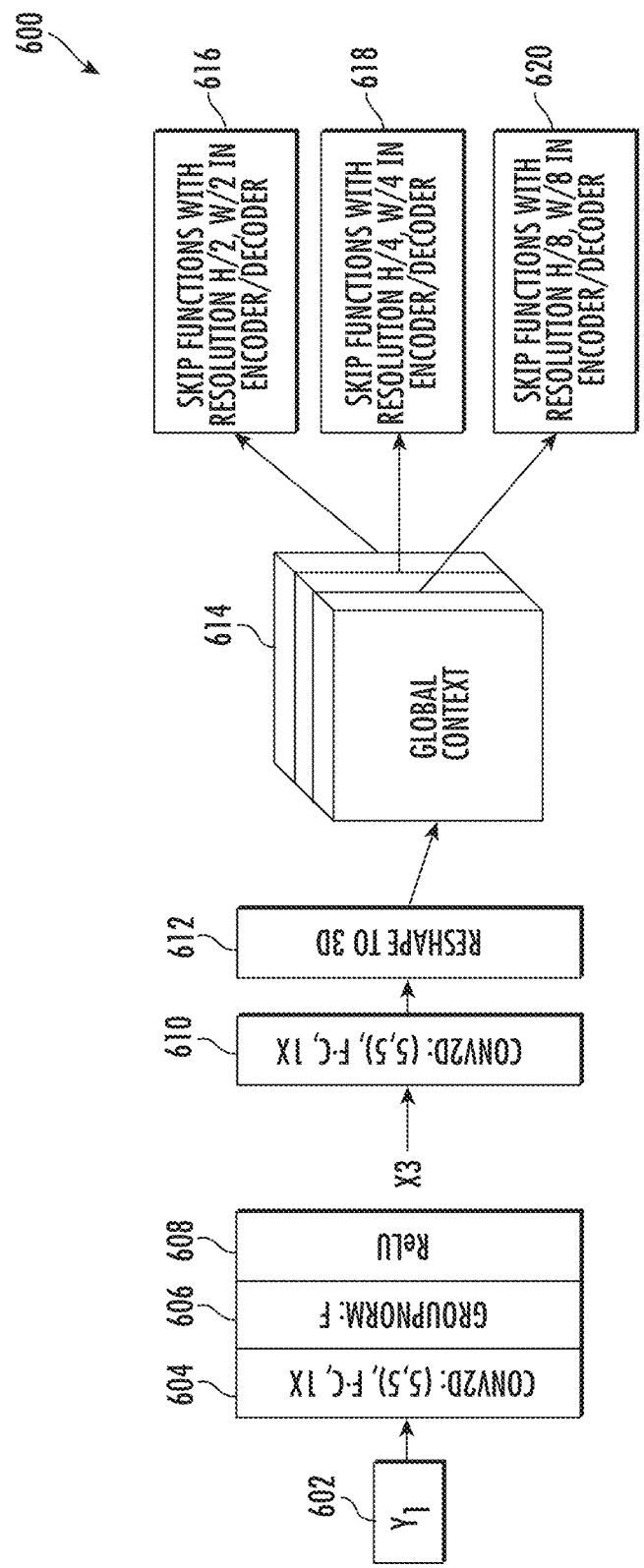
FIG. 9 depicts an example computing environment including a computer architecture of a global context component of a parametric skip function of a machine-learned image compression model according to example embodiments of the present disclosure.

FIG. 9 depicts an example computing environment 600 including a computing architecture of a global context component of a parametric skip function of a machine-learned image compression model according to example embodiments of the present disclosure. Example computing environment 600 can be used for producing a global context volume from an image 1 ($\bar{y}_1$), with three sub-contexts. Each sub-context is passed to the two corresponding skip functions at that resolution level, one in the encoder and one of the decoder.

The global context unit can take as input the first image code $y_1$ with dimensions M×H/16×W/16, where M is the channel dimension and H,W are the height/width of the original image. The global context component can pass $\bar{y}_1$ through four 2D convolutional layers 602. Each convolutional layer 602 except the last can be followed by a GroupNorm layer 606 and ReLU layer 608. In general, GroupNorm 606 can be used instead of BatchNorm in example models due to small batch sizes.

The dimension of each intermediate feature is F·C, where C is a maximum disparity and F is a multiplicative factor. The final global context output after the convolutional layer 610 is (F·C)×H/16×W/16), which can be reshaped by layer 612 into a 4D volume 614: F×C×H/16×W/16. Hence the global context can be seen as an initial cost volume (with an additional feature dimension), which can be provided as input to the skip functions at each level of the encoder/decoder.

It may be noted that there are three levels of skip functions 616, 618, and 620 in both the encoder/decoder, predicting cost volumes of dimensions C×H/2×W/2, C×H/4×W/4, and C×H/8×W/8 for the encoder and of dimensions C×H/8×W/8, C×H/4×W/4, and C×H/2×W/2 for the decoder. Since the disparity dimension remains fixed regardless of spatial resolution, the lower resolution cost volumes effectively have a greater receptive field than the higher resolution volumes. Ideally, the higher resolution volumes will have a big receptive field but this may be subject to GPU memory limits. This may also imply that the disparity dimensions are not spatially aligned across different spatial resolutions nor with the global context (at the lowest spatial resolution H/16×W/16, so feeding the global context as is to each level may not be optimal.

Accordingly, in some example, it may be ensured that F is divisible by 3, and that the global context volume actually represents a concatenation of three "sub" context volumes of dimensions $F_0$×C×H/16×W/16, where $F_0$=F/3. Each sub-context volume can be mapped as an input to a skip function 616, 618, or 620 at a corresponding resolution level in both the encoder/decoder (so one sub-context volume is mapped to the skip function in both the encoder and decoder at resolution H/8, W/8, etc.). This can allow each sub-context volume to represent a lower resolution feature representation to help predict a specific cost volume at a particular resolution level, as opposed to helping predict all cost volumes across all resolution levels.

Figure 10:
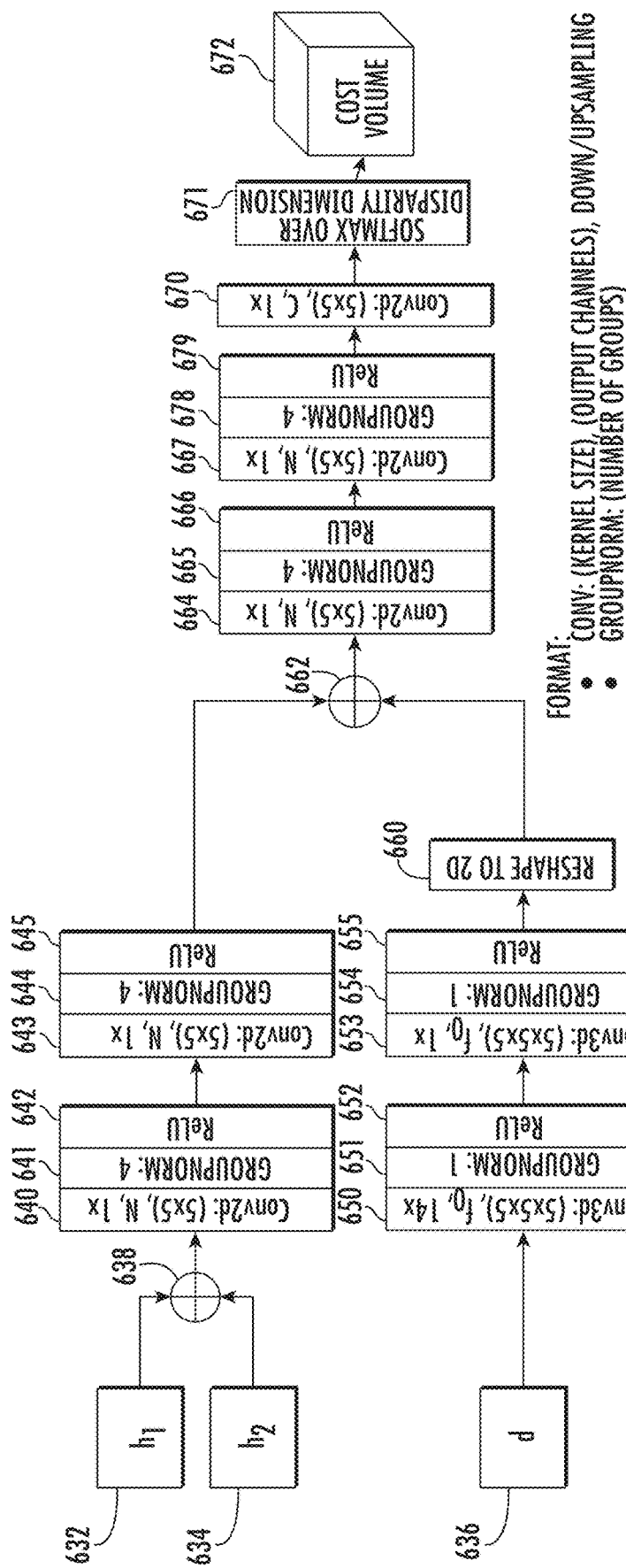
FIG. 10 depicts an example computing environment including a computer architecture of a cost volume component of a parametric skip function of a machine-learned image compression model according to example embodiments of the present disclosure.

FIG. 10 depicts an example computing environment 630 including a computer architecture of a cost volume component of a parametric skip function of a machine-learned image compression model according to example embodiments of the present disclosure. Example computing environment 630 can be used for producing a cost volume from $h_1^{t-1}$, $h_2^{t-1}$, $d^r$. The $\oplus$ symbol represents concatenating two tensors along the channel dimension.

If the input features to each skip function are at level t−1 with resolution r, the corresponding sub-context volume from the global context as can be denoted as $d^r$. The task of predicting the cost volume used for warping can take in d, as well as $h_1^{t-1}$, $h_2^{t-1}$ as input.

The model can concatenate (638) $h_1^{t-1}$, $h_2^{t-1}$ into a 2N×$H^{t-1}$×$W^{t-1}$ feature, and feed it through two 2d convolutions 640, 643, each followed by GroupNorm 641, 644 (with four groups per module) and ReLU 642, 645 after each convolution. The output feature can have dimensions N×$H^{t-1}$×$W^{t-1}$.

In another branch, the model can feed $d^r$, the sub-context volume, through an upsampling 3d convolution 650 to match the spatial resolution of $h_1^{t-1}$, $h_2^{t-1}$ (which is $H^{t-1}$,$W^{t-1}$), followed by another 3d convolution 653. Each 3d convolution also can be followed by GroupNorm 651, 654 (1 group per module) and ReLU 652, 655, and the intermediate feature channel dimensions can be $C \cdot F_0$. The output feature can have dimensions $F_0 \times C \times H^{t-1} \times W^{t-1}$, and using layer 660 this can be collapsed back into a 2d feature representation: $(F_0 \cdot C) \times H^{t-1} \times W^{t-1}$. In example embodiments, the upsampling rate can depend on the resolution level of the skip function. For example, it can be assumed that the feature spatial resolution is (H/4, W/4). Moreover, in example embodiments, only spatial dimensions are upsampled.

The outputs of both feature branches can be concatenated (662) and three more 2d convolution layers 664, 667, 670 can be added, with intermediate feature dimension N, each except the last followed by GroupNorm 665, 668 (4 groups each) and ReLU 666, 669. The final cost volume 672 can have dimensions $C \times H^{t-1} \times W^{t-1}$, with a softmax layer 671 applied over the disparity dimension for every $0 \le i, j \le H^{t-1}$, $W^{t-1}$.

Figure 11:
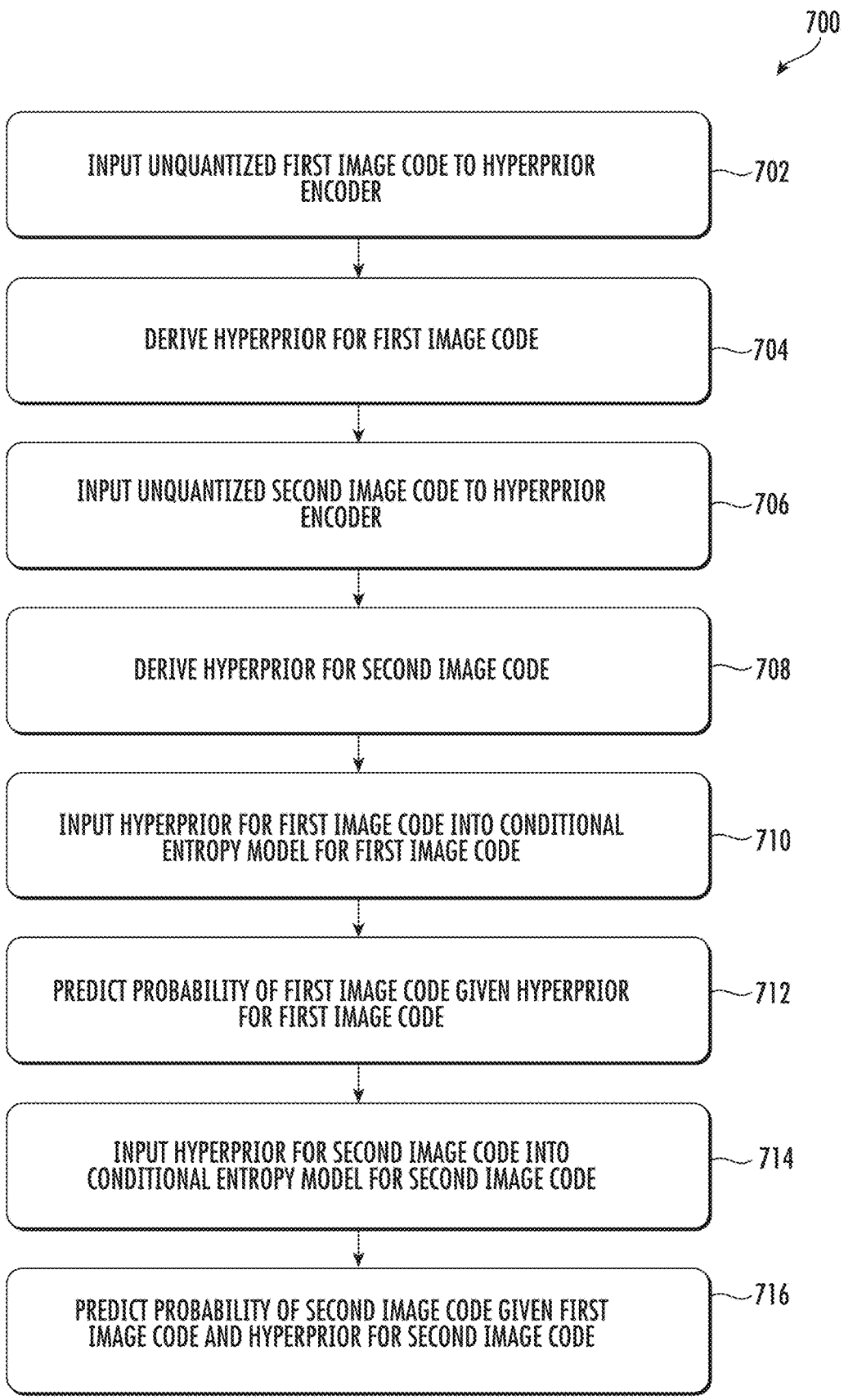
FIG. 11 depicts a flowchart illustrating an example method for modeling probabilistic dependence between images using a conditional entropy model of a machine-learned image compression model according to example embodiments of the present disclosure.

FIG. 11 depicts a flowchart illustrating an example method 700 for modeling probabilistic dependence between images using a conditional entropy model of a machine-learned image compression model according to example embodiments of the present disclosure. FIG. 11 is described with reference to FIG. 12 which depicts an example computing environment 800 including a hyper-encoder 802 and entropy model 804 of a machine-learned image compression model according to example embodiments of the present disclosure. Example computing environment 800 details the hyper-encoder 802 as well as the full entropy model 804 of $y_1$. The input (e.g., 702) to hyper-encoder 802 is $y_1$ (the continuous representation before being fed to the quantizer), not $\bar{y}_1$ (the noisy representation of $y_1$ applied as part of the quantizer during training). The hyper-encoder 802 produces $z_1$, which is fed into the GMM entropy model 804.

Referring to FIG. 11, at 702, method 700 can include inputting an unquantized first image code to a hyperprior encoder. At 704, method 700 can include deriving a hyperprior for the first image code.

According to some example aspects, the conditional entropy model can include a hyper-encoder 802 that derives the hyperprior variables, $\bar{z}_1, \bar{z}_2$ (820) from $y_1, y_2$ (804). It is noted that the unquantized continuous representation y can be passed into the hyperencoder, not $\bar{y}$, the noisy representation produced by the quantizer during training. Each y can be fed through 3 convolution layers 808, 812, 816, with ReLUs 810, 814 following the first two and the last two layers 812, 816 being downampled. An absolute layer 806 can be used in example embodiments. A quantizer 818 can be applied to produce output 820 including $\bar{z}$.

At 706, method 700 can include inputting the un-quantized second image code to the hyperprior encoder. At 708, method 700 can include deriving the hyper for the second image code.

At 710, method 700 can include inputting the hyper for the first image code into the conditional entropy model for the first image code. At 712, method 700 can include predicting the probability of the first image code given the hyper for the first image code.

Figure 12:
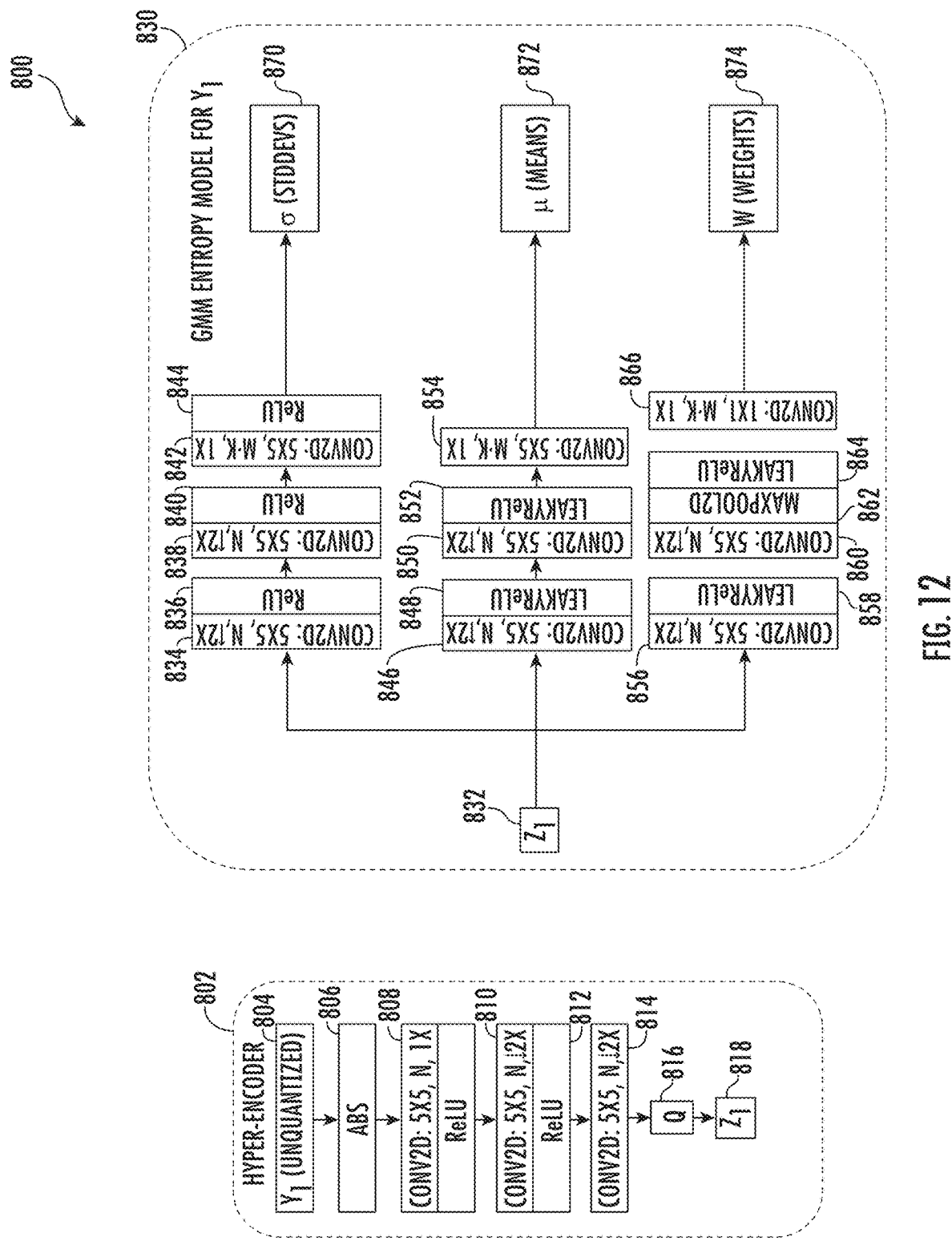
FIG. 12 depicts an example computing environment including a computer architecture of a hyper-encoder and entropy model of a machine-learned image compression model according to example embodiments of the present disclosure.

With reference to FIG. 12, the conditional entropy model can also include a hyperprior entropy model 830. The factorized entropy model for the hyperprior can be designed in modeling $c_i(\bar{z}_i; \theta_z)$. In order to define a valid cumulative density, $c_i(\bar{z}_i; \theta_z)$ can map values between [0,1] and can be monotonically increasing. The input $\bar{z}_i$ (832) and the output can be univariate (dimension=1).

In some examples, $c_i$ can be set to be a two-step nonlinear function as set forth in Equation 16:

$$c_i(\bar{z}_i; \theta_{\bar{z}}) = f_2 \circ f_1 \qquad \text{Equation 16}$$

In Equation 16, $f_1: \mathbb{R}^1 \to \mathbb{R}^3$ and $f_2: \mathbb{R}^3 \to \mathbb{R}^1$. The nature of each $f_k$ can be defined as set forth in Equation 17:

$$f_k(x) = g_k(\text{softplus}(H^k)x + b^k)$$

$$g_1(x) = x + \tan h(a^k) \odot \tan h(x)$$

$$g_2(x) = \text{sigmoid}(x) \qquad \text{Equation 17}$$

In Equation 17, $H^k$ are matrices, $b^k$ and $a^k$ are vectors, and $\odot$ is elementwise multiplication. This formulation satisfies the conditions to be a valid CDF. This same factorized prior formulation can be used for modeling the main image codes in models without hyperpriors. For the IE models, the factorized prior model can be used for both image codes. For the CE0 models, this factorized prior model can be used for the first image code.

In accordance with some implementations, the conditional entropy model can include an image codes entropy model. The image codes entropy model can include a GMM-based conditional entropy model for the image codes. For $\bar{y}_1$ recall that probabilities can be defined as $p_{1,i}(\bar{y}_{1,i} | \bar{z}_1; \theta_{\bar{y}1}) = (q_{1,i} * u)(\bar{y}_{1,i})$, where $q_{1,i} = \Sigma_k w_{ik} \mathcal{N}(\mu_{ik}, \sigma_{ik}^2))$. Predictions can be made of w, $\mu$, and $\sigma$ as functions of $z_1$ given—$\theta_{\bar{y}1}$: $w(\bar{z}_1; \theta_{\bar{y}1}), \mu(\bar{z}_1; \theta_{\bar{y}1}), \sigma(\bar{z}_1; \theta_{\bar{y}1})$, where w, $\mu$, and $\sigma$ represent the vectors of all the individual values $w_{ik}, \mu_{ik}, \sigma_{ik}$. In this example, $\sigma$ and $\mu$ have the same spatial resolution as $\bar{y}_1$ with up to K times the number of channels, where K is the number of mixtures ((M·K)×H/16×W/16). Moreover, to reduce the number of parameters and help maintain spatial invariance, it can be assumed that weights are fixed per channel, so weights have dimensions (M·K)×1×1(M K)11. A first branch for a can include convolutional layers 834, 838, and 842, each followed by an ReLU layer 836, 840, 844. An ReLU layer can be applied to the last layer of $\sigma(\bar{z}_1; \theta_{\bar{y}1})$ to keep standard deviations positive. A second branch for $\mu$ can include three convolutional layers 846, 850, and 854. The first two convolutional layers 846, 850 are followed by leaky ReLU layers 848, 852.

A third branch can be provided for weights w. The third branch includes three convolution layers 856, 860, 866. The first layer 846 is followed by a LeakyReLU layer 858. The second layer 860 is followed by a pooling layer 862 that can be applied after the second convolution layer 860 to collapse the spatial dimension. A softmax per mixture can be applied to keep weights normalized.

Returning to FIG. 11, at 714, method 700 can include inputting the hyper for the second image code into the conditional entropy model for the second image code. At 716, method 700 can include predicting the probability of the second image code given the first image code and the hyperprior for the second image code.

Figure 13:
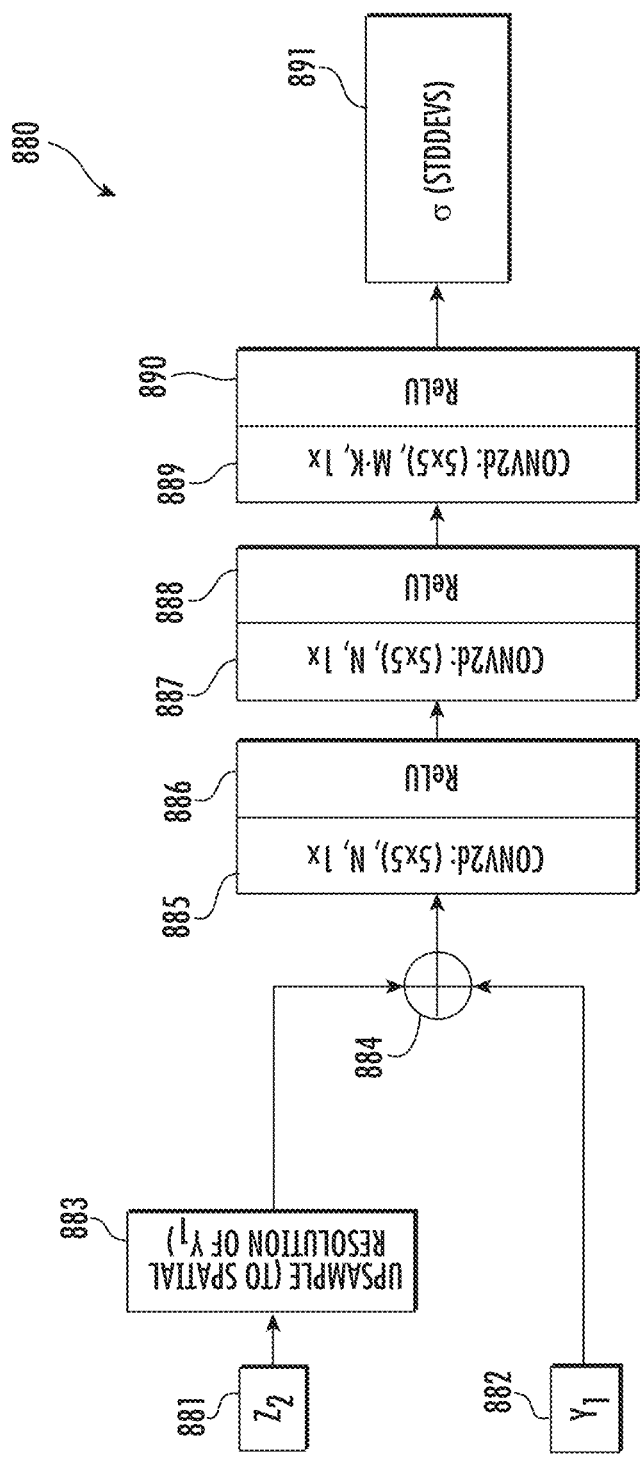
FIG. 13 depicts an example computing environment including a computer architecture of a portion of an entropy model of a machine-learned image compression model according to example embodiments of the present disclosure.

FIG. 13 depicts an example computing environment 880 including a computer architecture of a portion of an entropy model of a machine-learned image compression model according to example embodiments of the present disclosure. Example computing environment 880 is an example architecture illustrating how a can be predicted for $\bar{y}_2$. A notable difference is that $\bar{y}_1$ is concatenated with an upsampled $\bar{z}_2$ and the convolutions are no longer upsampling. The changes to predict w, $\mu$ can be the same.

A similar process can be followed to model $p_{2,i}(\bar{y}_{1,i} | \bar{z}_2; \bar{y}_1) = (q_{2,i} * u)(\bar{y}_{2,i})$. However, the network structure for predicting w, $\mu$, and $\sigma$ is slightly different because $\bar{z}_2, \bar{y}_1$ are not the same dimension. Instead, $\bar{z}_2$ can first be upsampled (883) to an intermediate value with the same dimensions of $\bar{y}_1$. Then this intermediate value can be concatenated (884) with $\bar{y}_1$ across the channel dimension and passed through the convolutional layers 885, 887, 889. The convolutions themselves are no longer upsampling, since the input is at the same desired spatial resolution as the output. ReLU layers 886, 888, 890 can be applied after each convolutional layer 885, 887, 889. An output 891 can be provided after the final convolutional layer 889 and ReLU layer 890.

Figure 14:
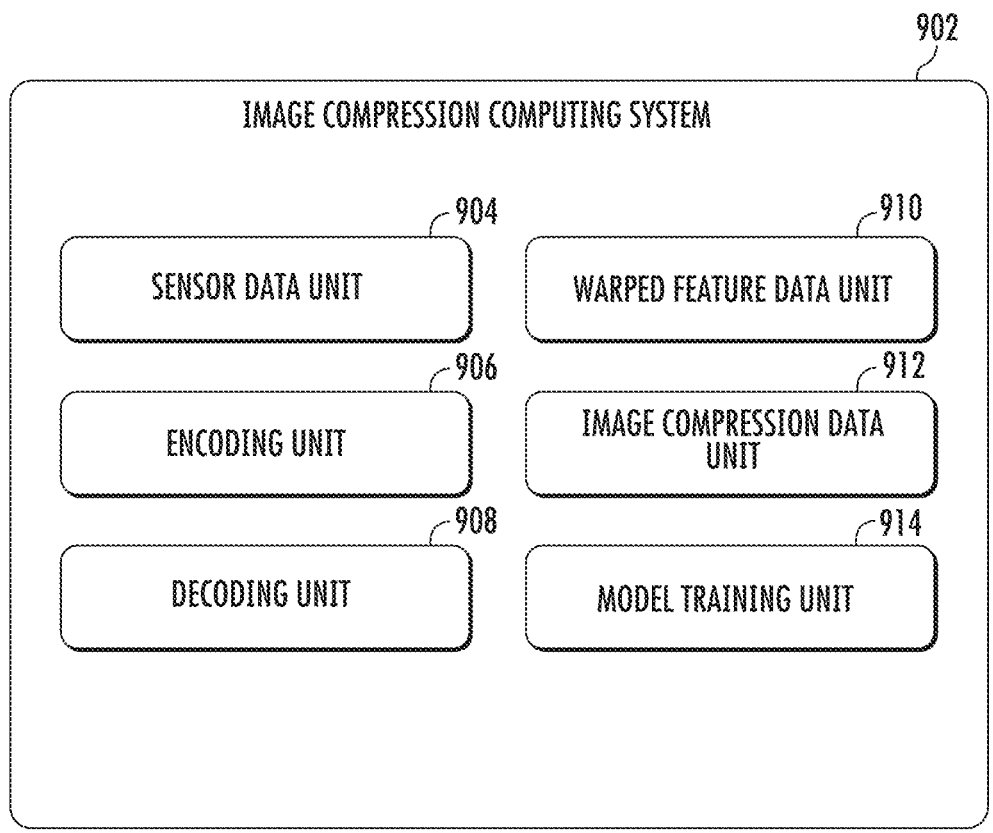
FIG. 14 depicts example system units for performing operations and functions according to example embodiments of the present disclosure.

Various means can be configured to perform the methods and processes described herein. FIG. 14 depicts an example of a computing environment including example means for performing the methods and processes described herein. FIG. 14 depicts an example image compression computing system 902 with units 904-914 for performing operations and functions according to example embodiments of the present disclosure. For example, image compression computing system 900 can include one or more sensor data unit(s) 904, one or more encoding unit(s) 906, one or more decoding unit(s) 908, one or more worked feature data unit(s) 910, one or more image compression data unit(s) 912, one or more model training unit(s) 914, and/or other means for performing the operations and functions described herein. In some implementations, one or more of the units 904-914 may be implemented separately. In some implementations, one or more of the units 904-914 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., method 300, method 350, method 550, and method 700) and/or other operations described herein can be implemented as such algorithm(s).

The means can be configured to obtain sensor data such as image data (e.g. from one or more image sensors such as cameras, etc.), LIDAR point cloud data associated with an environment external to an autonomous vehicle, RADAR data, etc. The means can be configured to obtain first image data indicative of a first image associated with a first image sensor and second image data indicative of a second image associated with a second image sensor. In some examples, the image data can be associated with at least two image sensors having at least partially overlapping fields of view. A sensor data unit 904 is one example of a means for obtaining sensor data such as image data as described herein.

The means can be configured to encode the first image data indicative of the first image into a first series of respective feature maps and a first image code. The means can be configured to generate the first image code based at least in part on first image data indicative of a first image associated with a first image sensor. The means can be configured to generate the first series of respective feature maps based at least in part on the first image. The means can include a first encoder configured to generate the first image code based at least in part on the first image data. The first encoder can include a first series of convolutional layers configured to generate the first series of respective feature maps based at least in part on the first image. An encoding unit 906 is one example of a means for encoding first image data indicative of the first image into a first series of respective feature maps and a first image code. An encoding unit 906 is one example of a means for generating a first image code based at least in part on first image data indicative of a first image associated with a first image sensor. An encoding unit 906 is one example of a means for generating a first series of respective feature maps based at least in part on the first image.

The means can be configured to encode the second image data indicative of the second image into a second series of respective feature map and a second image code based at least on disparity warped feature data. The means can be configured to generate a second image code based at least in part on second image data indicative of a second image associated with a second image sensor. The means can be configured to generate a second series of respective feature maps based at least in part on the second image and disparity warped feature data associated with the first image. The means can include a second encoder configured to generate the second image code based at least in part on the second image data. The second encoder can include a second series of convolutional layers configured to generate the second series of respective feature map based at least in part on the second image in the disparity warped feature data associated with the first image. An encoding unit 906 is one example of a means for generating a second image code based at least in part on second image data indicative of a second image associated with a second image sensor. An encoding unit 906 is one example of a means for generating a second series of respective feature map based at least in part on the second image and disparity warped feature data associated with the first image.

The means can be configured to generate disparity warped feature data associated with the first image. The means can be configured to generate the disparity warped feature data based at least in part on disparity associated with the first series of respective feature map and the second series of respective feature maps. The means can include a plurality of respective parametric skip functions associated with at least a subset of convolutional layers of the second series of convolutional layers of the second encoder. The plurality of respective parametric skip functions can be configured to generate the disparity warped feature data. A warped feature data unit 910 is one example of a means for generating disparity warped feature data.

The means can be configured to generate image compression data based at least in part on a first image and a second image. The compressed image data can be generated in response to image data associated with at least two image sensors having at least partially overlapping fields of view. An image compression data unit 912 is one example of a means for generating image compression data.

The means can be configured to train the machine learned image compression model end-to-end to minimize an objective function including a first term that encodes the reconstruction quality of the first image and the second image and a second term that is associated with a bit rate predicted by a conditional entropy model. The means can be configured to model a probabilistic dependence between the first image code and the second image code. The conditional entropy model can include one or more neural networks configured to model the probabilistic dependence between the first image code and the second image code. The conditional entropy model can model a probability of the second image conditioned on the image data indicative of the first image from the first image sensor. A model training unit 914 is one example of a means for training the machine learned image compression model.

The means can be configured to generate first reconstructed image data including a reconstruction of the first image based at least in part on the first image code. The means can be configured to generate a third series of respective feature maps based at least in part on the first image code. The means can include a first decoder configured to generate the first reconstructed image data. The first decoder can include a third series of convolutional layers configured to generate the third series of respective feature maps. A decoding unit 908 is one example of a means for generating first reconstructed image data including a reconstruction of the first image based at least in part on the first image code. A decoding unit 908 is one example of a means for generating a third series of respective feature map based at least in part on the first image code.

The means can be configured to generate second reconstructed image data including a reconstruction of the second image based at least in part on the second image code. The means can be configured to generate a fourth series of respective feature map based at least in part on the second image code and second disparity warped feature data associated with the first image. The means can include a second decoder configured to generate the second reconstructed image data. The second decoder can include a fourth series of convolutional layers configured to generate the fourth series of respective feature map. A decoding unit 908 is one example of a means for generating second reconstructed image data including a reconstruction of the second image based at least in part on the second image code. A decoding unit 908 is one example of a means for generating a fourth series of respective feature maps based at least in part on the second image code and the second disparity warped feature data associated with the first image.

The respective parametric skip function associated with each convolutional layer of the subset of convolutional layers of the second series of convolutional layers can be configured to generate a respective disparity-warped feature map based at least in part on disparity between the respective feature map from a previous convolutional layer of the second series of convolutional layers and the respective feature map from a previous convolutional layer of the first series of convolutional layers. The respective parametric skip function associated with each convolutional layer of the subset of convolutional layers of the second series of convolutional layers can be configured to generate the respective disparity-warped feature map based at least in part on the first image code.

The means can be configured to encode the first image code to a feature descriptor in order to capture global context information associated with the first image. The respective parametric skip function associated with each convolutional layer can include a fully convolutional global context encoding component configured to encode the first image code to the feature descriptor. A warped feature data unit 910 is one example of a means for encoding the first image code to a feature descriptor.

The means can be configured to estimate a cost volume based at least in part on the respective feature map from the first series of respective feature maps, the respective feature map from the second series of respective feature maps, and the global context information. The respective parametric skip function associated with each convolutional layer can include a stereo cost volume component configured to estimate the cost volume. A warped feature data unit 910 is one example of a means for estimating the cost volume.

The means can be configured to warp features associated with the first image to align with the second image based at least in part on the cost volume. The respective parametric skip function associated with each convolutional layer can include a feature warping component configured to warped features associated with the first image to align with the second image based at least in part on the cost volume. A warped feature data unit 910 is one example of a means for warping features associated with the first image to align with the second image.

The means can be configured to generate a respective predicted feature map for the second image based at least in part on the disparity warped feature data associated with the first image and the respective feature map from a previous convolutional layer of the second series of convolutional layers. The respective parametric skip function associated with at least a subset of convolutional layers can include an aggregation function configured to generate the respective predicted feature map for the second image.

Figure 15:
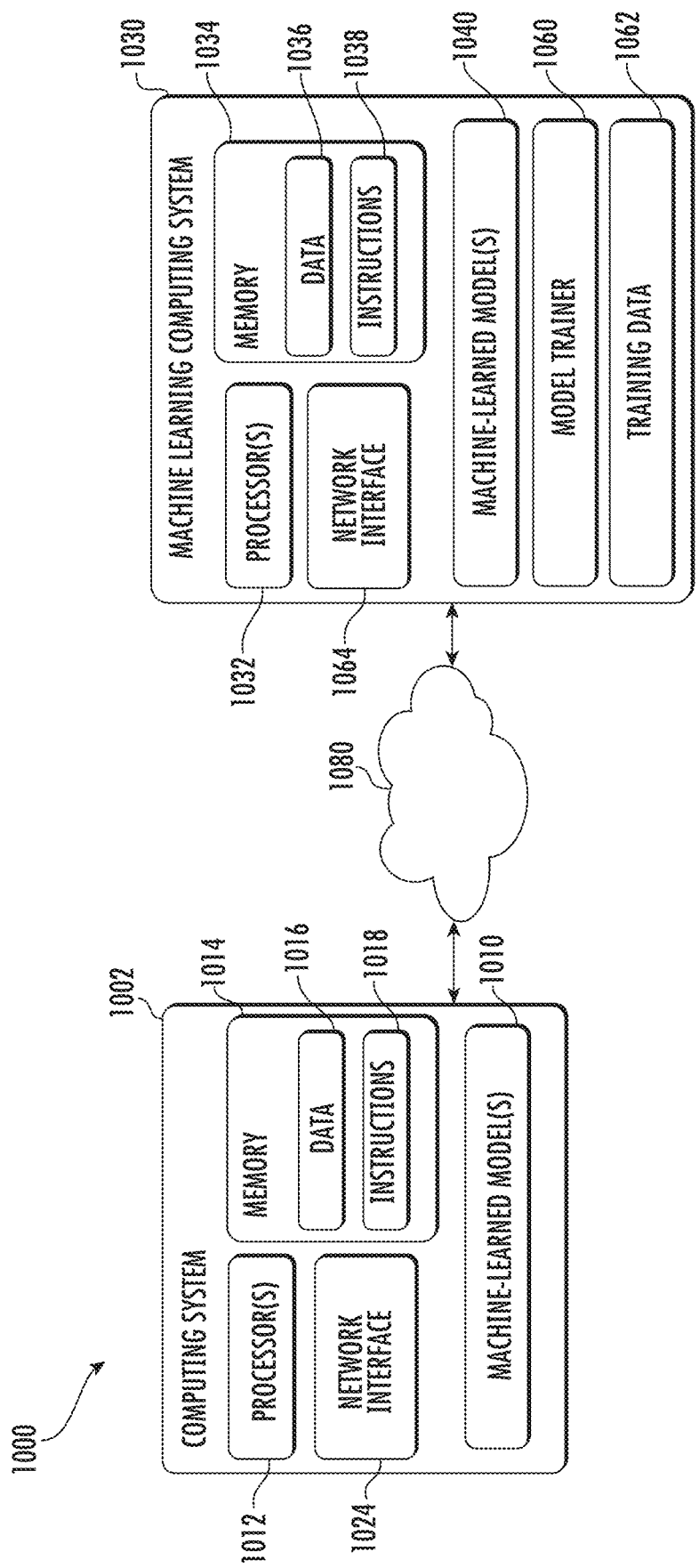
FIG. 15 depicts example system components according to example implementations of the present disclosure.

FIG. 15 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform various operations as part of motion planning for an autonomous vehicle. For example, computing system 1002 can receive sensor data map data associated with an environment external to an autonomous vehicle, and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating motion plans including target trajectories for an autonomous vehicle, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 15 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   one or more processors; and
   one or more non-transitory computer-readable media that collectively store a machine-learned image compression model configured to generate compressed image data in response to image data associated with at least two image sensors having at least partially overlapping fields of view, the machine-learned image compression model comprising:
   a first encoder configured to generate a first image code based at least in part on first image data indicative of a first image associated with a first image sensor, wherein the first encoder includes a first series of convolutional layers configured to generate a first series of respective feature maps based at least in part on the first image;
   a second encoder configured to generate a second image code based at least in part on second image data indicative of a second image associated with a second image sensor, wherein the second encoder includes a second series of convolutional layers configured to generate a second series of respective feature maps based at least in part on the second image and disparity-warped feature data associated with the first image; and
   a plurality of respective parametric skip functions associated with at least a subset of convolutional layers of the second series of convolutional layers and configured to generate the disparity-warped feature data based at least in part on disparity associated with the first series of respective feature maps and the second series of respective feature maps.

2. The computing system of claim 1, wherein the respective parametric skip function associated with each convolutional layer of the subset of convolutional layers of the second series of convolutional layers is configured to generate a respective disparity-warped feature map based at least in part on disparity between the respective feature map from a previous convolutional layer of the second series of convolutional layers and the respective feature map from a previous convolutional layer of the first series of convolutional layers.

3. The computing system of claim 2, wherein the respective parametric skip function associated with each convolutional layer of the subset of convolutional layers of the second series of convolutional layers is configured to generate the respective disparity-warped feature map based at least in part on the first image code.

4. The computing system of claim 1, wherein the machine-learned image compression model comprises:
a conditional entropy model including one or more neural networks configured to model a probabilistic dependence between the first image code and the second image code.

5. The computing system of claim 4, wherein:
the conditional entropy model models a probability of the second image conditioned on the image data indicative of the first image from the first image sensor.

6. The computing system of claim 4, wherein the disparity-warped feature data is first disparity-warped feature data, the plurality of respective parametric skip functions is a first plurality of respective parametric skip functions, and the machine-learned image compression model comprises:
a first decoder configured to generate first reconstructed image data including a reconstruction of the first image based at least in part on the first image code, wherein the first decoder includes a third series of convolutional layers configured to generate a third series of respective feature maps based at least in part on the first image code;
a second decoder configured to generate second reconstructed image data including a reconstruction of the second image based at least in part on the second image code, wherein the second decoder includes a fourth series of convolutional layers configured to generate a fourth series of respective feature maps based at least in part on the second image code and second disparity-warped feature data associated with the first image; and
a second plurality of respective parametric skip functions associated with at least a subset of convolutional layers of the fourth series of convolutional layers and configured to generate the second disparity-warped feature data based at least in part on disparity associated with the third series of respective feature maps and the fourth series of respective feature maps.

7. The computing system of claim 6, wherein:
the machine-learned image compression model is trained end-to-end to minimize an objective function including a first term that encodes a reconstruction quality of the first image and the second image and a second term that is associated with a bitrate predicted by the conditional entropy model.

8. The computing system of claim 1, wherein the respective parametric skip function associated with at least a subset of convolutional layers includes:
a fully convolutional global context encoding component configured to encode the first image code to a feature descriptor in order to capture global context information associated with the first image.

9. The computing system of claim 8, wherein the respective parametric skip function associated with at least a subset of convolutional layers includes:
a stereo cost volume component configured to estimate a cost volume based at least in part on the respective feature map from the first series of respective feature maps, the respective feature map from the second series of respective feature maps, and the global context information.

10. The computing system of claim 9, wherein the respective parametric skip function associated with at least a subset of convolutional layers includes:
a feature warping component configured to warp features associated with the first image to align with the second image based at least in part on the cost volume.

11. The computing system of claim 8, wherein the respective parametric skip function associated with at least a subset of convolutional layers includes:
an aggregation function configured to generate a respective predicted feature map for the second image based at least in part on the disparity-warped feature data associated with the first image and the respective feature map from a previous convolutional layer of the second series of convolutional layers.

12. The computing system of claim 1, wherein the one or more non-transitory computer-readable media collectively store instructions that, when executed by the one or more processors, cause the one or more processors to perform operations, the operations comprising:
obtaining the first image data indicative of the first image and the second image data indicative of the second image;
inputting the first image data indicative of the first image and the second image data indicative of the second image to the machine-learned image compression model; and
receiving compressed image data indicative of the first image code and the second image code as an output of the machine-learned image compression model in response to the first image data indicative of the first image and the second image data indicative of the second image.

13. A computer-implemented method of digital image compression, the method comprising:
obtaining, by a computing system comprising one or more computing devices, first image data indicative of a first image associated with a first image sensor and second image data indicative of a second image associated with a second image sensor;
encoding, by the computing system using a first series of convolutional layers of a machine-learned image compression model, the first image data indicative of the first image into a first series of respective feature maps and a first image code;
generating, by the computing system using a plurality of parametric skip functions of the machine-learned image compression model, disparity-warped featured data based at least in part on the first series of respective feature maps and a second series of respective feature maps; and
encoding, by the computing system using a second series of convolutional layers of a machine-learned image compression model, the second image data indicative of the second image into the second series of respective feature maps and a second image code based at least in part on the disparity-warped feature data.

14. The computer-implemented method of claim 13, wherein encoding the first image data indicative of the first image into the first image code and encoding the second image data indicative of the second image into the second image code comprises:
modeling a probabilistic dependence between the first image code and the second image code, wherein a probability of the second image is conditioned on the first image.

15. The computer-implemented method of claim 13, wherein generating disparity-warped feature data comprises:
generating the disparity-warped feature data based at least in part on the first image code, the first series of respective feature maps, and the second series of respective feature maps.

16. The computer-implemented method of claim 15, wherein:
each parametric skip function of the plurality of parametric skip functions is respectively associated with at least a subset of convolutional layers of the second series of convolutional layers; and
generating disparity-warped feature data comprises generating, by a respective parametric skip function for each convolutional layer of the subset of convolutional layers, a respective disparity-warped feature map based at least in part on disparity between the respective feature map from a previous convolutional layer of the second series of convolutional layers and the respective feature map from a previous convolutional layer of the first series of convolutional layers.

17. The computer-implemented method of claim 15, wherein the disparity-warped feature data is first disparity-warped feature data and the plurality of respective parametric skip functions is a first plurality of respective parametric skip functions, the method further comprising:
generating first reconstructed image data including a reconstruction of the first image using a first decoder comprising a third series of convolutional layers of the machine-learned image compression model, wherein generating the first reconstructed image data including the reconstruction of the first image includes generating a third series of respective feature maps based at least in part on the first image code;
generating, using a second plurality of respective parametric skip functions associated with at least a subset of convolutional layers of the third series of convolutional layers, second disparity-warped feature data based at least in part on disparity associated with the third series of respective feature maps and a fourth series of respective feature maps; and
generating second reconstructed image data including a reconstruction of the second image using a second decoder comprising a fourth series of convolutional layers of the machine-learned image compression model, wherein generating the second reconstructed image data including the reconstruction of the second image includes generating the fourth series of respective feature maps based at least in part on the second image code and the disparity-warped feature data associated with the first image.

18. The computer-implemented method of claim 13, wherein:
the machine-learned image compression model is trained end-to-end to minimize an objective function including a first term that encodes a reconstruction quality of the first image and the second image and a second term that is associated with a bitrate predicted by a conditional entropy model.

19. An autonomous vehicle, comprising:
a plurality of vehicle sensors including a first image sensor and a second image sensor;
one or more processors; and
one or more tangible, non-transitory, computer readable media that collectively store instructions that when executed by the one or more processors cause the one or more processors to perform operations comprising:
obtaining first image data indicative of a first image associated with the first image sensor and second image data indicative of a second image associated with the second image sensor;
encoding, using a first series of convolutional layers of a machine-learned image compression model, the first image data indicative of the first image into a first series of respective feature maps and a first image code;
generating, using a plurality of skip functions of the machine-learned image compression model, disparity-warped featured data based at least in part on the first series of respective feature maps and a second series of respective feature maps; and
encoding, using a second series of convolutional layers of the machine-learned image compression model, the second image data indicative of the second image into the second series of respective feature maps and a second image code based at least in part on the disparity-warped feature data.

20. The autonomous vehicle of any of claim 19, wherein the disparity-warped feature data is first disparity-warped feature data and the plurality of respective parametric skip functions is a first plurality of respective parametric skip functions, the operations further comprising
generating first reconstructed image data including a reconstruction of the first image using a first decoder comprising a third series of convolutional layers of the machine-learned image compression model, wherein generating the first reconstructed image data including the reconstruction of the first image includes generating a third series of respective feature maps based at least in part on the first image code;
generating, using a second plurality of respective parametric skip functions associated with at least a subset of convolutional layers of the third series of convolutional layers, second disparity-warped feature data based at least in part on the third series of respective feature maps and a fourth series of respective feature maps;
generating second reconstructed image data including a reconstruction of the second image using a second decoder comprising a fourth series of convolutional layers of the machine-learned image compression model, wherein generating the second reconstructed image data including the reconstruction of the second image includes generating the fourth series of respective feature maps based at least in part on the second image code; and
generating one or more motion plans based at least in part on the first reconstructed image data and the second reconstructed image data.

* * * * *